(12) United States Patent
Xia et al.

(10) Patent No.: US 9,256,257 B2
(45) Date of Patent: Feb. 9, 2016

(54) ELECTRONIC DEVICE AND DOCKING STATION

(71) Applicant: Lenovo (Beijing) Co., Ltd., Beijing (CN)

(72) Inventors: Xiaosong Xia, Beijing (CN); Liang Han, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 176 days.

(21) Appl. No.: 14/196,521

(22) Filed: Mar. 4, 2014

(65) Prior Publication Data

US 2014/0247551 A1 Sep. 4, 2014

(30) Foreign Application Priority Data

Mar. 4, 2013 (CN) .......................... 2013 1 0067370
May 20, 2013 (CN) .......................... 2013 1 0188279

(51) Int. Cl.
*G06F 1/16* (2006.01)
(52) U.S. Cl.
CPC ............ *G06F 1/1632* (2013.01); *G06F 1/1681* (2013.01)
(58) Field of Classification Search
USPC ................. 455/41.3, 41.2, 557, 575.8, 404.2, 455/556.1, 418, 41.1, 416, 417, 575.3; 439/607.01, 676, 533; 361/679.03, 361/679.3, 679.43, 679.09, 679.31, 679.41, 361/679.26, 679.4, 679.44, 679.55, 679.58, 361/679.17, 679.29, 679.08, 679.59; 345/173, 174, 179, 419, 158, 169, 213; 248/371, 176.3, 121, 205.1, 274.1
See application file for complete search history.

(56) References Cited

U.S. PATENT DOCUMENTS

| | | | | |
|---|---|---|---|---|
| 9,001,511 | B2* | 4/2015 | Gobeil ................. | G06F 1/1626 248/316.4 |
| 2009/0009957 | A1* | 1/2009 | Crooijmans .......... | G06F 1/1632 361/679.41 |
| 2010/0250789 | A1* | 9/2010 | Collopy ................ | G06F 1/1616 710/13 |

\* cited by examiner

*Primary Examiner* — Hung Duong
(74) *Attorney, Agent, or Firm* — Harness, Dickey & Pierce, P.L.C.

(57) ABSTRACT

An electronic device, including: a first body, a second body, a first coupling member and a second coupling member; in the case where the first body and the second body are located in a first relative position, the first body and the second body are coupled together by cooperation between the first coupling member and the second coupling member; and in the case where the first body and the second body are located in a second relative position different from the first relative position, the first body and the second body are decoupled from each other by cooperation between the first coupling member and the second coupling member.

29 Claims, 13 Drawing Sheets

ELECTRONIC DEVICE AND DOCKING STATION

CROSS-REFERENCES TO RELATED APPLICATIONS

The present application claims the priority to Chinese Patent Application No. 201310067370.2, entitled "ELECTRONIC DEVICE AND DOCKING STATION", filed with the Chinese State Intellectual Property Office on Mar. 4, 2013, and the priority to Chinese Patent Application No. 201310188279.6, entitled "ELECTRONIC DEVICE AND DOCKING STATION", field with the Chinese State Intellectual Property Office on May 20, 2013, which are incorporated herein by reference in their entireties.

TECHNICAL FILED

The application relates to the technical field of computer, and in particular to an electronic device and a docking station.

BACKGROUND

With the development of computer technology, more and more electronic devices come into people's lives, work and other aspects, bringing a lot of convenience for people. Such as, tablet computers, smart phones, smart TV.

At present, taking the notebook computer as an example, in order to improve the usage experience of user, notebook computer manufacturer launches an ultrabook with both the notebook computer form and the tablet computer form, the ultrabook includes a tablet computer and an auxiliary input device. User may realize the notebook computer form of the ultrabook by coupling the tablet computer with the auxiliary device. When the user wants to go out, the tablet computer may be separated from the auxiliary device, so merely the tablet computer is carried, thereby realizing the tablet computer form of the ultrabook.

But in the process of realizing the technical solution of the embodiment of the present application, the inventor of the present application observed that it is difficult for the user to couple the electronic device and the auxiliary device or separate the electronic device from the auxiliary device, and resulting a poor user experience.

SUMMARY

According to the embodiments of the present application, it is provided a electronic device and a docking station to solve the problem stated above.

In one aspect, according to an embodiment of the application, there is provided an electronic device, including: a first body, a second body, a first coupling member and a second coupling member; in the case where the first body and the second body are located in a first position, the first body and the second body are coupled together by cooperation between the first coupling member and the second coupling member; and in the case where the first body and the second body are located in a second relative position different from the first relative position, the first body and the second body are decoupled from each other by cooperation between the first coupling member and the second coupling member.

Optionally, the first coupling member is provided on the first body, the second coupling member is provided on the second body.

Optionally, the first body is movable with respect to the second body in a first mode or in a second mode different from the first mode; where the first body and the second body are decoupled from each other, in the case where the first body moves in the first mode from the first relative position to the second relative position with respect to the second body; and the first body and the second body remain coupled, in the case where the first body moves in the second mode from the first relative position to the second relative position with respect to the second body.

Optionally, in the case where the first body moves in the first mode from the first relative position to the second relative position with respect to the second body, the first coupling member is switched from a first state to a second state different from the first state to be decoupled from the second coupling member, leading to decouple of the first body and the second body.

Optionally, the second body further includes a rotary shaft disposed on a first side of the second coupling member; and the first body is rotatable about the rotary shaft from the first relative position to the second relative position with respect to the second body in the case where the first body keeps in contact with the second body.

Optionally, in the case where the first body and the second body are rotatable about the rotary shaft from the first relative position to the second relative position via at least one transition position between the first relative position and the second relative position, the first body and the second body are decoupled from each other.

Optionally, the second body further includes a first cam sleeved on the rotary shaft, and the first cam includes:
a first engagement member;
a second engagement member; and
a linkage disposed on the second engagement member and separably connected to the second coupling member;
in the case where the first body rotates from the first relative position to the second relative position with respect to the second body, the first engagement member rotates from the first position to the second position with respect to the second engagement member, to facilitate the second engagement member relatively sliding with respect to the rotary shaft towards a first direction, and the second coupling member sliding towards the first direction by the linkage, such that the first coupling member and the second coupling member are decoupled from each other.

Optionally, the first engagement member includes a first end provided with at least two recesses;
the second engagement member includes a second end and a third end different from the second end, the second end is provided with at least two protrusions which match the at least two recesses, and the linkage is provided on the third end;
the at least two recesses and the at least two protrusions are in a first state, in the case where the first engagement member is located in the first position with respect to the second engagement member; and the at least two recesses and the at least two protrusions are in a second state, in the case where the first engagement member is located in the second position with respect to the second engagement member, wherein the first state is different from the second state.

Optionally, the second body further includes a force application mechanism configured to provide a first acting force to the first body in the case where the first body and the second body are located in the second relative position, to decouple and separate the first body and the second body.

Optionally, in the case where the first body is located in the second relative position with respect to the second body, a ratio of transformation from external force acting on at least one of the first body and the second body by a user to a first acting force is greater than a first threshold, where the first acting force is the minimum force separating the first body from the second body.

Optionally, the first coupling member is articulated to the first body, and an inserting portion is formed between the first coupling member and the first body at an articulating side; the second coupling member is articulated to the second coupling member, and the second coupling member is rotatably switched between an unlocking position and a locking position with respect to the first coupling member.

Optionally, in a coupling state, the second body is inserted into the inserting portion; in the locking position, the second coupling member is engagingly fixed to the second body via fitted engaging structures; the second coupling member is provided with an unlocking protruding portion, and is configured as: with the second body, the first coupling member and the second coupling member rotating synchronously to a preset opening-closing angular position, the unlocking protruding portion abuts against the first body, to form a torque for driving the second coupling member to rotatably switch to the unlocking position, and the engaging structures between the second body and the second coupling member separated from each other.

Optionally, the electronic device further includes:
an elastic component releasing elastic deformation energy to the second coupling member to facilitate the second coupling to keeping in the locking position with respect to the first coupling member.

Optimally, the first coupling member and the second coupling member are articulated via an articulating shaft, the elastic component is a torsion spring sleeved on the articulating shaft, and a spring leg of the torsion spring abuts against the second coupling member to facilitate the second coupling member storing elastic deformation energy in the case where the second coupling member is rotatably switched to the unlocking position.

Optionally, the first coupling member and the first body are articulated to each other along articulating side edges of the first body and the second body at two side ends; the articulating side edge of the first coupling member is provided with an accommodating part, and the articulating side edge of the first body has an outer projection for being placed in the accommodating portion; in the case where the second coupling member rotates to a preset opening-closing angular position, a bottom edge of the accommodating portion abuts against a outer surface of the first body for position limiting.

Optionally, the second coupling member is embeddingly provided in a middle portion of the first coupling member, and the second coupling member has an outer circumferential surface in a shape accordant with that of the first coupling member in the case where the first body and the second body are in the coupling state.

Optionally, an outer surface of the second body at the articulating side has an inner concave portion; in the coupling state, the inner concave portion of the second body is embeddingly mounted with the first coupling member, and the first coupling member has an outer circumferential surface in a shape accordant with that of the second body.

Optionally, an enclosing member forming the inserting portion is provided at a side of the first coupling member facing the first body.

Optionally, the engaging structures are an outer bump and an inner recess, with either one of the both being arranged on an inner side surface of the second coupling member, and the other one is arranged on the second body.

In another aspect, according to an embodiment of the application, there is provided a docking station separably connected to an electronic device provided with a first coupling member, the docking station including:
a second coupling member which matches the first coupling member; in the case where the electronic device and the docking station are located in a first relative position, the electronic device and the docking station are coupled together by cooperation between the first coupling member and the second coupling member; and in the case where the electronic device and the docking station are located in a second relative position different from the first relative position, the electronic device and the docking station are decoupled from each other by cooperation between the first coupling member and the second coupling member.

Optionally, the electronic device is movable with respect to the docking station in a first mode or in a second mode different from the first mode; the electronic device and the docking station are decoupled from each other, in the case where the electronic device moves in the first mode from the first relative position to the second relative position with respect to the docking station; and the electronic device and the docking station remain coupled, in the case where the electronic device moves in the second mode from the first relative position to the second relative position with respect to the docking station.

Optionally, in the case where the electronic device moves in the first mode from the first relative position to the second relative position with respect to the docking station, the first coupling member is switched from a first state to a second state different from the first state to be decoupled from the second coupling member, leading to the decouple of the electronic device and the docking station.

Optionally, the docking station further includes a rotary shaft disposed on a first side of the second coupling member, and the electronic device is rotatable about the rotary shaft from the first relative position to the second relative position with respect to the docking station in the case where the electronic device keeps in contact with the docking station.

Optionally, in the case where the electronic device and the docking station are rotatable about the rotary shaft from the first relative position to the second relative position via at least one transition position between the first relative position and the second relative position, the electronic device and the docking station are decoupled from each other.

Optionally, the docking station further includes a first cam sleeved on the rotary shaft, and the first cam includes:
a first engagement member;
a second engagement member; and
a linkage disposed on the second engagement member and separably connected to the second coupling member;
in the case where the electronic device rotates from the first relative position to the second relative position with respect to the docking station, the first engagement member rotates from the first position to the second position with respect to the second engagement member, to facilitate the second engagement member relatively sliding with respect to the rotary shaft towards a first direction, and the second coupling member sliding towards the first direction by the linkage, such that the first coupling member and the second coupling member are decoupled from each other.

Optionally, the first engagement member includes a first end provided with at least two recesses;
the second engagement member includes a second end and a third end different from the second end, the second end is provided with at least two protrusions which match the at least two recesses, and the linkage is provided on the third end;

the at least two recesses and the at least two protrusions are in a first state, in the case where the first engagement member is located in the first position with respect to the second engagement member; and the at least two recesses and the at least two protrusions are in a second state, in the case where the first engagement member is located in the second position with respect to the second engagement member, where the first state is different from the second state.

Optionally, the docking station further includes a force application mechanism configured to provide a first acting force to the electronic device in the case where the electronic device and the docking station are located in the second relative position, to decouple and separate the electronic device and the docking station.

Optionally, in the case where the electronic device is located in the second relative position with respect to the docking station, a ratio of transformation from external force acting on at least one of the electronic device and the docking station by a user to a first acting force is greater than a first threshold, where the first acting force is the minimum force separating the electronic device from the docking station.

Optionally, the first coupling member is articulated to a body of the docking station, and an inserting portion is formed between the first coupling member and the docking station at an articulating side;
the second coupling member is articulated to the second coupling member, and the second coupling member is rotatably switched between an unlocking position and a locking position with respect to the first coupling member;
in a coupling state, the electronic device is inserted into the inserting portion; in the locking position, the second coupling member is engagingly fixed to the electronic device via fitted engaging structures; the second coupling member is provided with an unlocking protruding portion, and is configured as: with the electronic device, the first coupling member and the second coupling member rotating synchronously to a preset opening-closing angular position, the unlocking protruding portion abuts against the body of the docking station, to form a torque for driving the second coupling member to rotatably switch to the unlocking position, and the engaging structures between the second body and the second coupling member separated from each other.

Optimally, the docking station further includes:
an elastic component releasing elastic deformation energy to the second coupling member to facilitate the second coupling to keeping in the locking position with respect to the first coupling member.

Optionally, first coupling member and the second coupling member are articulated via an articulating shaft, the elastic component is a torsion spring sleeved on the articulating shaft, and a spring leg of the torsion spring abuts against the second coupling member to facilitate the second coupling member storing elastic deformation energy in the case where the second coupling member is rotatably switched to the unlocking position.

DETAILED DESCRIPTION

Figure 1:
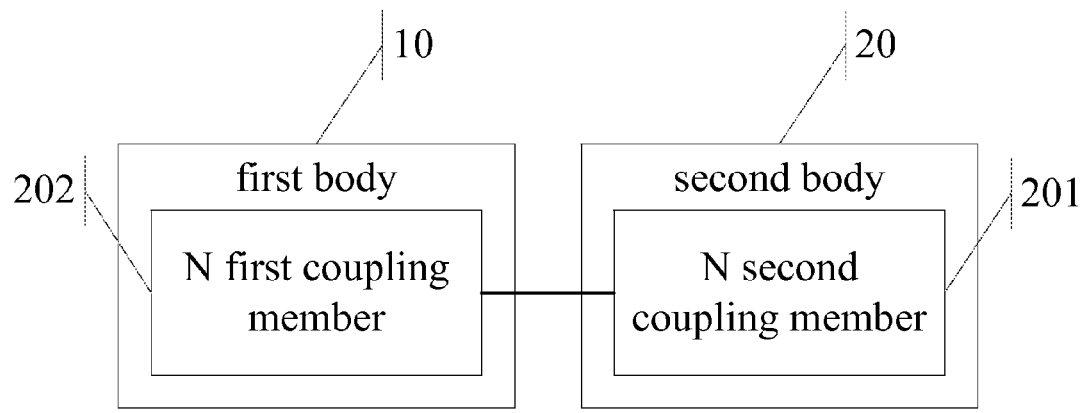
FIG. 1 is a schematic structural diagram of an electronic device according to an embodiment of the present application.

The embodiments of the present application solves, by providing an electronic device and a docking station, the technical problem in the prior art that it is difficult for a user to couple the electronic device and the auxiliary device or separate the electronic device from the auxiliary device.

According to the embodiments of the present application, it is provided an electronic device, which includes: a first body, a second body, a first coupling member and a second coupling member;
in the case where the first body and the second body are located in a first relative position, the first body and the second body are coupled together by cooperation between the first coupling member and the second coupling member; and in the case where the first body and the second body are located in a second relative position different from the first relative position, the first body and the second body are decoupled from each other by cooperation between the first coupling member and the second coupling member.

In the actual application, the electronic device may include N first coupling member and N second coupling member, where N is an integer greater than or equal to 1. in the case the electronic device includes N first coupling member and N second coupling member, the technical solution of the embodiments of the present application is as follows.

In the case where a first body and a second body keep in contact with each other, if the first body and the second body are located in a first relative position, the first body and the second body can be coupled together as an integral piece by the cooperation between N first coupling members and N second coupling members. In this case, if a first acting force is applied to the first body in a direction facing away from the second body, the first body and the second body are not separated from each other. Moreover, if the first body and the second body are located in a second relative position, the first body and the second body can be decoupled from each other but remain in contact with each other, by the cooperation between the N first coupling members and the N second coupling members. In this case, if the above-mentioned first acting force is applied to the first body, the first body and the second body are separated from each other. Therefore, when separating the first body from the second body, the user only has to adjust the relative position between the first body and the second body into the second relative position without applying a large force and then the first body and the second body can be easily separated from each other. In this way, the technical problem in the prior art that the electronic device can not withstand excessive force acting on the auxiliary device by the user and is damaged during the separation of the electronic device and the auxiliary device in the case where the spring and the engagement mechanism are adopted to couple the electronic device and the auxiliary device is effectively solved, improving the service life of the electronic device. Furthermore, the user can use a smaller force to easily separate the first body from the second body, leading to a good user experience.

Hereinafter, the technical solution of the present application is described in detail in conjunction with the accompanying drawings and the embodiments. It should be understood that the embodiments and the specific features described in embodiments are detailed description of the technical solution of the present application, but not limit the technical solution of the present application. The embodiments of the present application and the technical features therein may be combined with each other without contradiction.

In one respect, according to an embodiment of the present application, it is provided an electronic device. As shown in FIG. 1, the electronic device includes: a first body 10 having N first coupling members 101, where N is an integer greater than or equal to 1, a second body 20 having N second coupling members 201 matching with the first coupling members 101. In the case where the first body 10 keeps in contact with the second body 20, if the first body 10 and the second body 20 are located in the first relative position, the first body 10 is coupled with the second body 20 by the cooperation between the N first coupling members 101 and the N second coupling members 201; if the first body 10 and the second body 20 are located in the second relative position different from the first relative position, the first body 10 is decoupled with the second body 20 by the cooperation between the N first coupling members 101 and the N second coupling members 201, so that the first body 10 is separable from the second body 20. Here, N may refer to an integer, such as 1, 2, 3, 5, 10, and the embodiments of the present application are not limited thereto.

The above "coupling" refers to that, in the case where the first body 10 keeps in contact with the second body 20, and the first body 10 and the second body 20 are located in the first relative position, the first body 10 and the second body 20 are coupled together as an integral piece by the cooperation between the N first coupling members 101 and the N second coupling members 201. In this case, if an acting force is applied to the first body 10 in the direction facing away from the second body 20, the first body 10 is not separated from the second body 20. However, when the first body 10 keeps in contact with the second body 20, and the first body 10 and the second body 20 are located in the second relative position, the first body 10 is decoupled with the second body 20 by the cooperation between the N first coupling members 101 and the N second coupling members 201. In this case, if the above acting force is applied to the first body 10, the first body 10 is separable from the second body 20, that is to say, the first body 10 and the second body 20 can be decoupled with each other as two individual ones.

Hereinafter, the said "coupling" described in one or more embodiments has the same meaning with the above "coupling", it is therefore omitted for simplicity.

The first body 10 may include a display unit. In a special implementation, the first body 10 may be a display part of a laptop, or may be a tablet computer; the second body 20 may include an input means, such as a keyboard and a touch pad, of course, it also may be a combination of a keyboard and a touch pad, then, the second body 20 may be a keyboard and a host part of a laptop, and also may be a docking station with an input means. In the case where the first body 10 is coupled with the second body 20, by a data communication between the first body 10 and the second body 20, the second body 20 may serve as an input means of the first body 10 and may form a complete device together with the first body 10, and functions such as input, storage, or browsing and the like can be realized. Of course, the first body 10 and the second body 20 also may be other functional bodies, as long as the first body 10 and the second body 20 can integrally serve as one electronic device to achieve at least one function in the case where they are coupled with each other together, and the embodiments of the present application are not limited thereto.

In a special implementation, the first coupling member 101 and the second coupling member 201 described above are coupling members matching with each other, which may be a engagement member, such as a bayonet and a hook; of course, they may also be a magnetic member, such as an electromagnet and an iron, which may be determined by the skilled in the art himself/herself and the embodiment of the present application are not limited thereto.

Figure 2A:
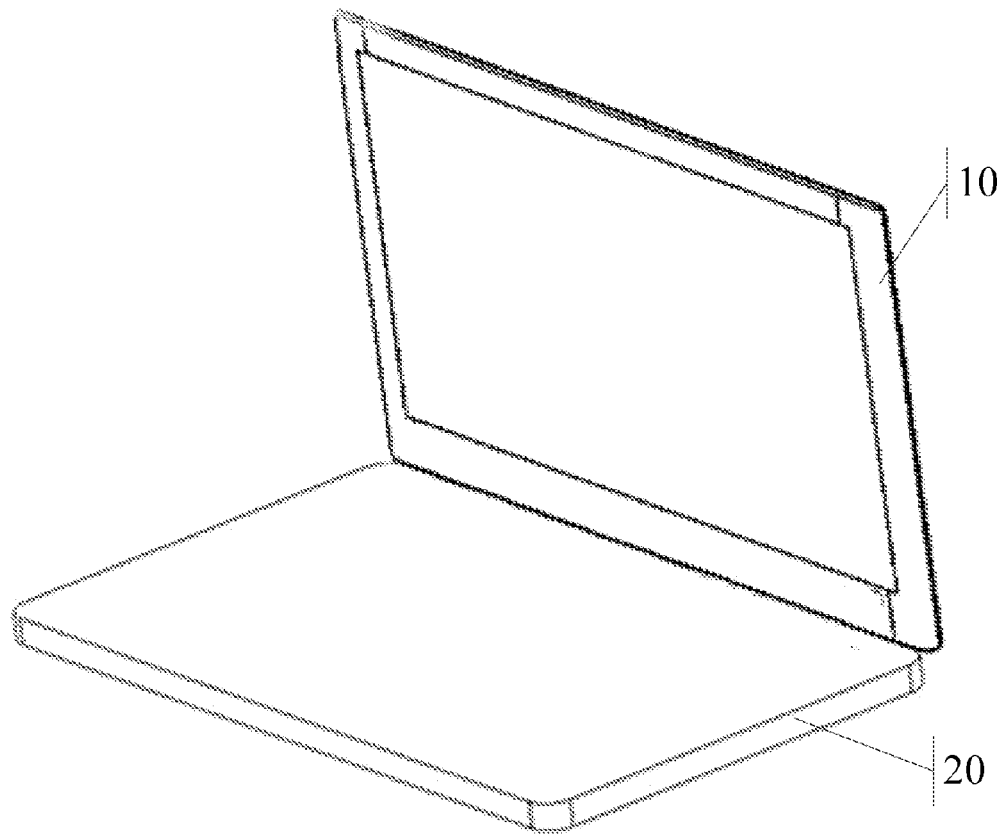
FIGS. 2A to 2B are schematic diagrams showing relative position relationships of a first body and a second body according to an embodiment of the present application.
Figure 2B:
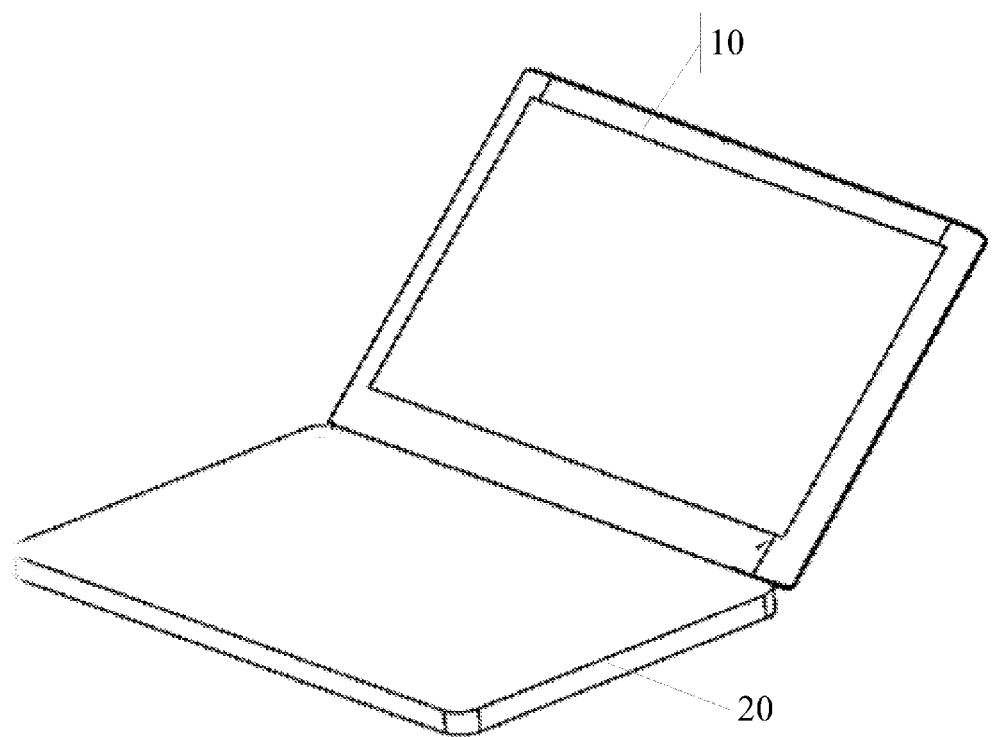

Specifically, in the case where the first coupling member 101 and the second coupling member 201 are engagement members is taken as an example. There are two relative positions for the first body 10 and the second body 20, i.e. a first relative position shown in FIG. 2A and a second relative position shown in FIG. 2B. In the case where the first body 10 keeps in contact with the second body 20, if the first body 10 and the second body 20 are located in the first relative position, the N first coupling member 101 and the N second member 201 are coupled together, for example the bayonet and the hook are engaged with each other, such that the first body 10 and the second body 20 are also coupled with each other; if the first body 10 and the second body 20 are located in the second relative position, the N first coupling member 101 and the N second member 201 are decoupled from each other, for example the bayonet and the hook are not engaged, such that the first body 10 and the second body 20 are also decoupled from each other. However, in this case, if the above-mentioned acting force is not applied to the first body 10, the first body 10 is still in contact with the second body 20. That is, viewed from the exterior, the first body 10 and the second body 20 are still an integral piece. At this time, the first body 10 may continue to be moved relative to the second body 20 into another first relative position.

The second relative position is explained in detail as follows.

The second relative position is the position at which the first body 10 and the second body 20 are decoupled from each other. Specifically, there are the following several cases.

In a first case, the second relative position may be a critical position of the opening-closing range of the first body 10 and the second body 20. For example, taking a board type electronic device as an example, if the number of degree of an angle between the first body 10 and the second body 20 is used to indicate a relative position between the first body 10 and the second body 20, the above-mentioned angle value corresponding to the second relative position is a critical value of the opening-closing angle of the first body and the second body 20, the critical value of the above-mentioned angle may be 0°, 110°, 180°, 360°. Of course, the above-mentioned angle value also may be an interval of the above-mentioned critical values or any angle contained in these intervals, such as [0°, 5°], [105°, 110°], [175°, 180°], [355°, 360°], 3°, 107°, 179°, 358°. In practical application, a special value of the angle between the first body 10 and the second body 20 may be determined according to an actual opening-closing angle of the electronic device, and the embodiments of the present application are not limited thereto.

In a second case, the second relative position also may be a value within the opening-closing range of the first body 10 and the second body 20. Still taking a board type electronic device as an example, in the case where the second relative position is a value within the opening-closing range of the first body 10 and the second body 20, the second relative position may be some specific positions. Then, in the case where the first body 10 and the second body 20 are located in these specific positions, the ratio of the transformation from external force acting on at least one of the first body 10 and the second body 20 by a user to a first acting force is greater than a first threshold, where the first acting force is the minimum acting force which can separate the first body 10 from the second body 20. That is, the second relative position is the position at which the external force acting on at least one of the first body 10 and the second body 20 by a user is transformed into the first acting force in a greater transformation ratio than the first threshold.

Firstly, the first acting force is explained. The first acting force is the minimum acting force which is applied on at lease one of the first body 10 and the second body 20 to separate the first body 10 from the second body 20. That is, the first acting force can just separate the first body 10 from the second body 20.

Viewed from the direction of the first acting force, the first acting force is the acting force which separates the first body 10 from the second body 20. Still taking a board type electronic device as an example, the direction of the first acting force is a first direction which is directed from the first side of the first body 10 contacting the second body 20 toward the opposite side of the first side along the first body 10 or the second body 20. Of course, electronic devices can also have other shapes but not limited to the above-mentioned board type electronic device. Based on the shapes of different electronic devices, the first direction also has different situations, as long as the first direction is the direction in which the first body 10 is separated from the second body 20, and the embodiments of the present application are not limited thereto.

Viewed from the magnitude of the first acting force, the first acting force is the minimum acting force required for separating the first body 10 from the second body 20. That is, the minimum acting force applied by electronic devices themselves or the user of electronic devices on at least one of the first body 10 and the second body 20, for separating the first body 10 from the second body 20. In practical application, due to different structures of electronic devices, the stress environments for them are also different. Therefore, the value of the above-mentioned minimum acting force is also different. But the embodiments of the present application are not limited thereto, as long as it is the minimum acting force required for separating the first body 10 from the second body 20.

Next, in a second case, in the case where the first body 10 and the second body 20 are located in the second relative position, i.e. the above-mentioned specific position, the ratio of the transformation from external force acting on at lease one of the first body and the second body by a user to a first acting force is greater than a first threshold, that is, a ratio of the compound of the external force applied by the user in the first direction to the external force exceeds the first threshold. This first threshold may be 50%, 65%, 80% etc. Of course, in order to make the acting force applied by the user as maximum as possible be used for separating the first body 10 from the second body 20, the higher the transformation ratio is, the better the result is. Preferably, the first threshold may be 90%, 99%, or even 100%. In practical application, due to different structures of electronic devices, the skilled in the art may have different expectations in the transformation ratio. The magnitude of the first threshold may be set by the skilled in the art as required and the embodiments of the present application are not limited thereto.

In order to obtain the above-mentioned transformation ratio as maximum as possible and make it easy for the user to apply an acting force, for the board type electronic devices, based on the structure of the electronic devices, the external force applied by the user on at least one of the first body 10 and the second body 20, may be a force perpendicular to the first body 10 or the second body 20, or may be a force which is directed toward a direction facing away from the second body 20 along the first body 10, or may be an acting force which is directed toward a direction facing away from the first body 10 along the second body 20. Then, the second relative position may have two cases, that is, a position at which the first body 10 is approximately perpendicular to the second body 20, or a position at which the first body 10 and the second body 20 are approximately in the same plane.

For example, in the first case, in the case where the second relative position is the position at which the first body 10 is approximately perpendicular to the second body 20, the angle between the first body 10 and the second body 20 can be taken as one or more angle values of 90° and 270°; it can also be taken as one or more angle intervals of [85°, 95°] and [265°, 275°]; it can also be taken as any one of the angle values in the above-mentioned angle intervals, such as 89°, 91°, 267°, 273°. Of course, the value of the angle between the first body 10 and the second body 20 is not limited to any of the above-mentioned angle values, it is also not limited to the above-mentioned angle intervals, as long as the first body 10 is approximately perpendicular to the second body 20, it can be set by the skilled in the art as required and the embodiments of the present application are not limited thereto.

n the second case, in the case where the second relative position is the position at which the first body 10 and second body 20 are approximately in the same plane, the angle between the first body 10 and the second body 20 may be taken as the angle value of 180°, it may also be taken as the angle interval of [175°, 185°], it may also be taken as any angle values in the above-mentioned angle intervals, such as 177°, 179°, 181°, 182°. Of course, the value of the angle between the first body 10 and the second body 20 is not limited to the above-mentioned angle values, it is also not limited to the above-mentioned angle intervals, as long as the first body 10 and the second body 20 are approximately in the same plane, it may be set by the skilled in the art as required and the embodiments of the present application are not limited thereto.

Furthermore, for the second case, throughout the opening-closing range between the first body 10 and the second body 20, there may be one or more second relative positions. In the case where there is only one second relative position, the second relative position may be any one in the above-mentioned first case or the second case, and when being in the first case, the second relative position may only be taken as one angle value or one angular interval. In the case where there are multiple second relative positions, these second relative positions may be discretely distributed within the opening-closing range, and the second relative position may be the above-mentioned combinations of the first case and the first case, the first case and the second case. For example, in the case where the opening-closing range between the first body 10 and the second body 20 is [0°, 360°], the first case and the second case are combined, the angle corresponding to the second relative position may be taken as {90°, 180°, 270°}, it may also be taken as [85°, 95°]∩[175°, 185°]∩[265°, 275°], it may also be taken by taking value from each subinterval of the above-mentioned intervals and thereby forming the collection of three angle values, such as {91°, 179°, 272°}; in the case where the first case and the first case are combined, the angle corresponding to the second relative position may be taken as {90°, 270°}, it may also be taken as [85°, 95°]∩[265°, 275°], it may also be taken by taking value from each subinterval of the above-mentioned intervals and thereby forming the collection of two angle values, such as {89°, 268°}. Similarly, the value of the angle between the first body 10 and the second body 20 is not limited to the above-mentioned angle values, it is also not limited to the above-mentioned angle intervals, it may be set by the skilled in the art as required and the embodiments of the present application are not limited thereto.

In the case where the second relative position is in the above-mentioned cases, the angle between the first body 10 and the second body 20 corresponding to the first relative position is any one of angle of all the opening-closing angles of the first body 10 and the second body 20 without any of the angles corresponding to the second relative position.

In each above-mentioned embodiment, the specific ways for moving the first body 10 from the first relative position to the second relative position with respect to the second body 20 may be divided into: a first mode and a second mode different from the first mode. The first body 10 and the second body 20 are decoupled from each other, if the first body 10 moves in the first mode from the first relative position to the second relative position with respect to the second body 20; the first body 10 and the second body 20 remain coupled, if the first body 10 moves in the second mode from the first relative position to the second relative position with respect to the second body 20.

For example, taking a screw cover electronic device as an example, that is the first body 10 is coupled to the second body 20 by two rotary shafts which each set in different direction. A rotary shaft A is disposed to be perpendicular to a hemline of the first body 10, and a rotary shaft B is disposed to be parallel to a hemline of the first body 10. In this case, when the first body 10 is pushed by the user such that it moves to the second relative position through the rotary shaft B, i.e. the first body 10 moves to the second relative position in the first mode, a first coupling member 101 and a second coupling member 201 can be decoupled from each other, i.e. a engagement mechanism in a bayonet is not engaged with a hook, thus the first body 10 and the second body 20 can be decoupled from each other. Whereas, when the first body 10 is pushed by the user such that it moves to the second relative position through the rotary shaft A, i.e. the first body 10 moves to the second relative position in the second mode, the first coupling member 101 and the second coupling member 201 can not be decoupled from each other, i.e. a engagement mechanism in a bayonet does not move and is still engaged with the hook, thus the first body 10 and the second body 20 can not be decoupled from each other, i.e. they remain coupled. Of course, the first body 10 may rotate to the second relative position in the first mode, i.e., via the rotary shaft; the first body 10 may also slide to the second relative position in the second mode, i.e. via the slideway. In this case, only when the first body 10 rotates to the second relative position via the rotary shaft, the first coupling member 101 can be decoupled with the second coupling member 201, and when the first body 10 slides to the second relative position via the slideway, the first coupling member 101 can not be decoupled with the second coupling member 201. In practical applications, the first mode and the second mode may also have other kinds of implement and the embodiments of the present application are not limited thereto.

Furthermore, the first body 10 moves with respect to the second body 20 from the first relative position to the second relative position in the first mode, which can be divided into the following two cases.

In the first case, in the case where the first body 10 moves in the first mode from the first relative position to the second relative position with respect to the second body 20, the N first coupling members 101 are switched from a first state to a second state different from the first state to be decoupled from the N second coupling members 201, leading to the decouple of the first body 10 and the second body 20.

Figure 3A:
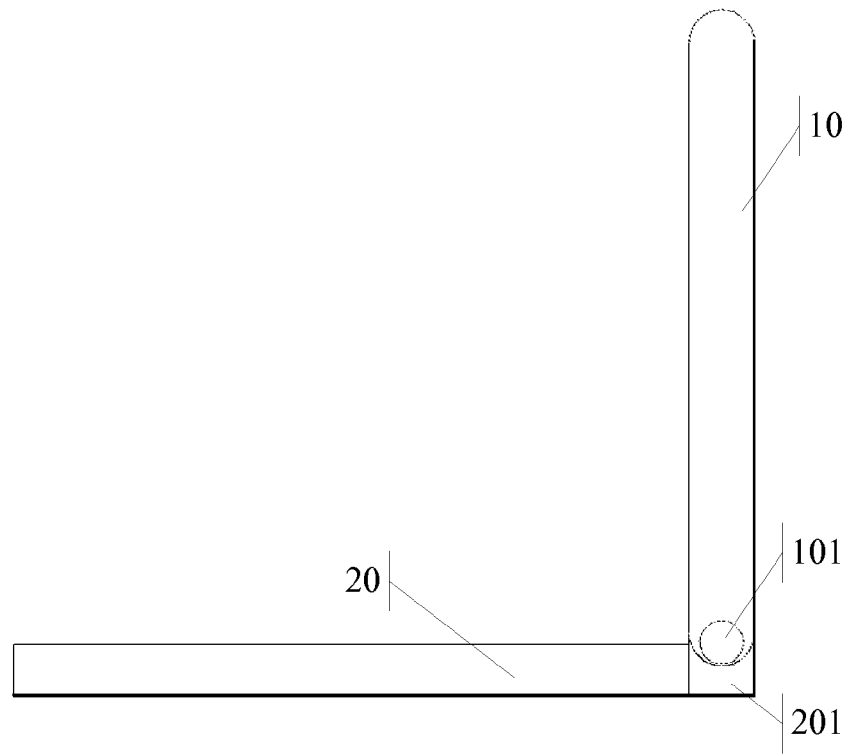
FIGS. 3A to 3B are schematic diagrams showing structures for implementing a first mode of movement according to embodiments of the present application.

Specifically, as shown in FIG. 3A, in the case where the first coupling member 101 and the second coupling member 201 are magnetic members, for example, the first coupling member 101 is an electromagnet and the second coupling member 201 also may be an electromagnet. If the first body 10 and the second body 20 are located in the first position, the first coupling member 101 may be a first polarity, the second coupling member 201 may be a second polarity. For example, the first polarity is N pole, the second polarity is S pole; or for example, the first polarity is S pole, the second polarity is N pole. In this case, the first coupling member 101 attracts the second coupling member 201, i.e. the first coupling member 101 couples to the second coupling member 201. Next, the first body 10 moves to the second relative position in the first mode. In this case, an angle between the first body 10 and the second body 20 is detected by the user pressing a mechanical switcher or an electronic switcher, or an angle sensor provided on the first body 10. In the case where the angle reaches to a predetermined angle, i.e. the first body 10 moves to the second position with respect to the second body 20, an electronic device controls the polarity of the first couple 101 to be switched from the first polarity to the second polarity such as from N pole to S pole or from S pole to N pole according to an trigger operation described above by the user. In this way, the first coupling member 101 cannot attract the second coupling member 201, that is, the first coupling member 101 is decoupled from the second coupling member 201, leading to the decouple of the first body and the second body.

If there are multiple second relative positions in the opening-closing range between the first body 10 and the second body 20, such as two second relative positions, i.e. a second relative position A and a second relative position B respectively, in the case where the first body 10 firstly moves to the second relative position A with respect to the second body 20, the polarity of the first coupling member 101 is triggered to be changed and the first coupling member 101 cannot attract the second coupling member 201, i.e. the first coupling member 101 is decoupled from the second coupling member 201. While in this case, the first body 10 does not separate from the second body 20 if the first body 10 is not subjected to the first acting force described above. Next, the first body 10 continues to move with respect to the second body 20 till it reaches to the second relative position B. In this case, the polarity of the first coupling member 101 is triggered to be changed again and the first coupling member 101 is decoupled from the second coupling member 201. Then the first body 10 can be separated from the second body 20 if the first body 10 is subjected to the first acting force described above at the time.

Apparently, in the case where there are multiple second relative positions in the opening-closing range between the first body 10 and the second body 20, it is possible to achieve the process described above by other mechanism, such as a cam. In the case where the first body 10 firstly moves to the second relative position A with respect to the second body 20, the cam is in a complete non-engagement state so that the first coupling member 101 is decoupled from the second coupling member 201 connecting with the cam. While in this case, the first body 10 doses not separate from the second body 20 if the first body 10 is not subjected to the first acting force described above. Next, the first body 10 continues to move with respect to the second body 20 till it reaches to the second relative position B. In this case, the cam is switched from the complete non-engagement state to a complete engagement state and again switched to the complete non-engagement state. In the case where the first coupling member 101 is decoupled from the second coupling member 201, and the first body 10 is subjected to the first acting force described above, the first body 10 can be separated from the second body 20.

Figure 3B:
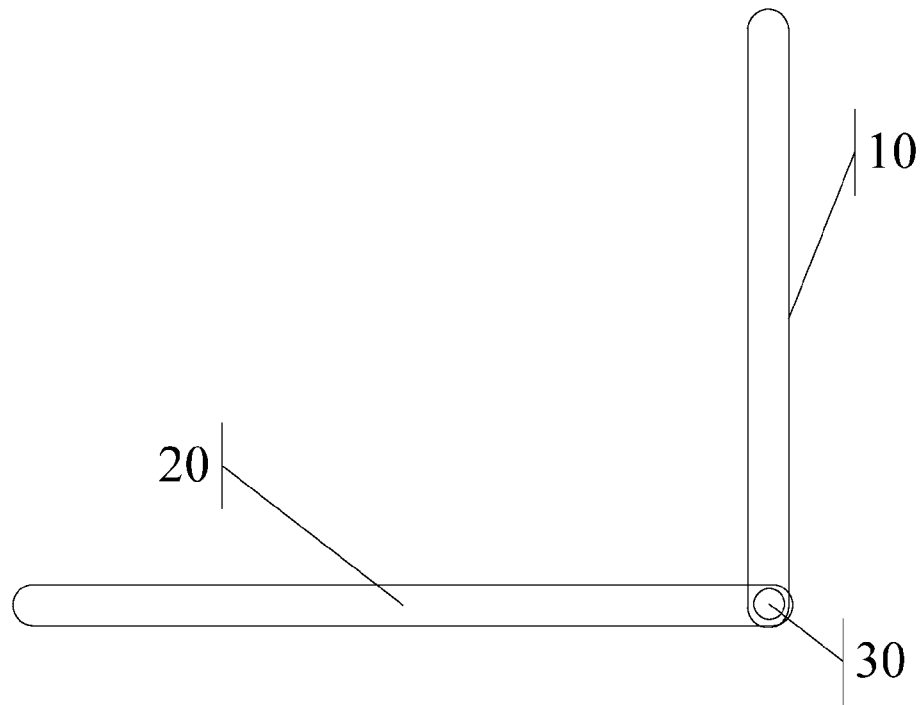

In the second case, as shown in FIG. 3B, the second body 20 further includes a rotary shaft 30 disposed on a first side of the N second coupling members 201, and the first body 10 is rotatable about the rotary shaft 30 from the first relative position to the second relative position with respect to the second body 20 in the case where the first body 10 keeps in contact with the second body 20 so that the first body 10 is decoupled from the second body 20.

Specifically, the second body 20 further includes a rotary shaft 30 disposed on the first side of the second coupling member 201, i.e. disposed parallel to an edge on which the first body 10 contacts with the second body 20 at the side close to the second body 20. Apparently, the rotary shaft 30 may also be disposed at the side away from the second body 20. Then it is possible that the first body 10 is rotatable about the rotary shaft 30 from the first relative position to the second relative position with respect to the second body 20 in the case where the first body 10 keeps in contact with the second body 20.

In another embodiment, in the solution described above in FIG. 1, the second body 20 further includes a rotary shaft 30 so that the first body 10 is rotatable about the rotary shaft 30 from the first relative position to the second relative position with respect to the second body 20 in the case where the first body 10 keeps in contact with the second body 20.

Furthermore, based on the second case corresponding to FIG. 3B, if the user inserts the N second coupling members 201 (assuming N=2) such as hooks of the second body 20 into 2 corresponding first coupling members such as bayonets of the first body 20 in the case where the first body 10 and the second body 20 in the first relative position, the hook is engaged with the bayonet. In this way, the first body 10 is coupled to the second body 20. Next, the first body 10 moves with respect to the second body 20 till the first body 10 reaches the second relative position. In this case, it is possible to provide two modes in order to cause the first coupling member 101 to be decoupled from the second coupling member 201. In the first mode, in the case where the first body 10 and the second body 20 are located in the second relative position, the first coupling member 101 and the second coupling member 102 can be decoupled from each other by the user pressing a mechanical switch or an electronic switch; in the second mode, in a continuous process, the first coupling member 101 is decoupled from the second coupling member 201 by the mutual action of mechanical structures. The specific mechanical structure is described in detail in the following embodiments.

Furthermore, in the case where the first body 10 and the second body 20 are continuously rotatable about the rotary shaft 30 from the first relative position to the second relative position via at least one transition position between the first relative position and the second relative position, the first body 10 and the second body 20 are decoupled from each other, so that the first body 10 is separable from the second body 20, which is corresponding to the second mode described above.

Specifically, the process that the first body 10 rotates about the rotary shaft 30 from the first relative position to the second relative position is a continuous process. For example, in the process that the first body 10 rotates from the first relative position at which the angle between the first body 10 and the second body 20 is 30°, to the second relative position at which the angle between the first body 10 and the second body 20 is 90°, the first body 10 may pass at least one transition position, at which the angle between the first relative position and the second relative position at the relative position may be 45°, 60°, 89° and the like. At these transition positions, the first body 10 and the second body 20 can remain be stable. It is considered to be an effective rotation only if the rotation passes these transition positions, thus the first coupling member 101 and the second coupling member 201 can be decoupled from each other, and the first body 10 is decoupled from the second body 20. It is considered to be an ineffective rotation if the first body 10 rotates directly to the second relative position without passing these transition positions, thus the first coupling member 101 and the second coupling member 201 cannot be decoupled from each other, and the first body 10 cannot be decoupled from the second body 20.

Figure 4:
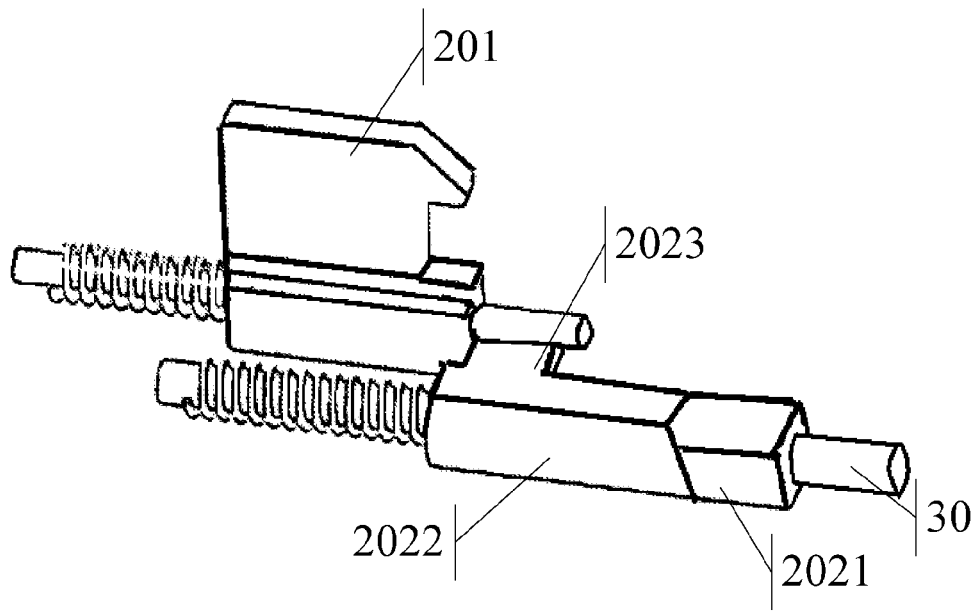
FIG. 4 is a structural diagram of a first cam according to an embodiment of the present application.

Furthermore, as shown in FIG. 4, the second body 20 further includes a first cam sleeved on the rotary shaft 30. The first cam includes: a first engagement member 2021; a second engagement member 2022; and a linkage 2023 disposed on the second engagement member 2022 and separately connected to the second coupling member 201. In the case where the first body 10 rotates from the first relative position to the second relative position with respect to the second body 20, the first engagement member 2021 rotates from the first position to the second position with respect to the second engagement member 2022 such that the second engagement member 2022 relatively slides with respect to the rotary shaft 30 towards a first direction and causes; by the linkage 2023, the second coupling member 201 to slide toward the first direction, leading to decouple of the first coupling member 101 and the second coupling member 201 so that the first body 10 is separable from the second body 20.

Figure 5A:
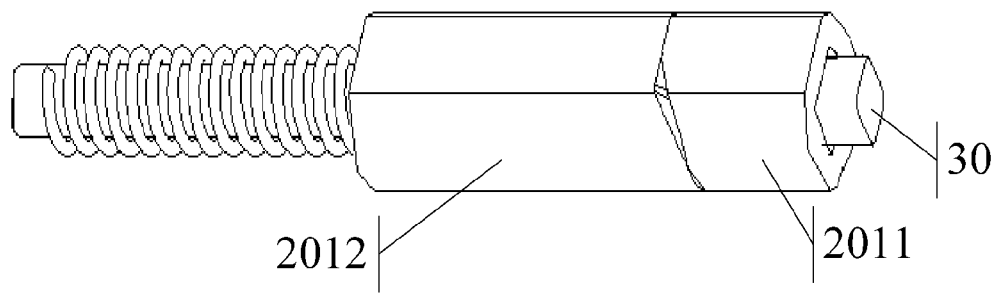
FIGS. 5A to 5B are diagrams showing position relationships between a first engagement member and a second engagement member according to an embodiment of the present application.
Figure 5B:
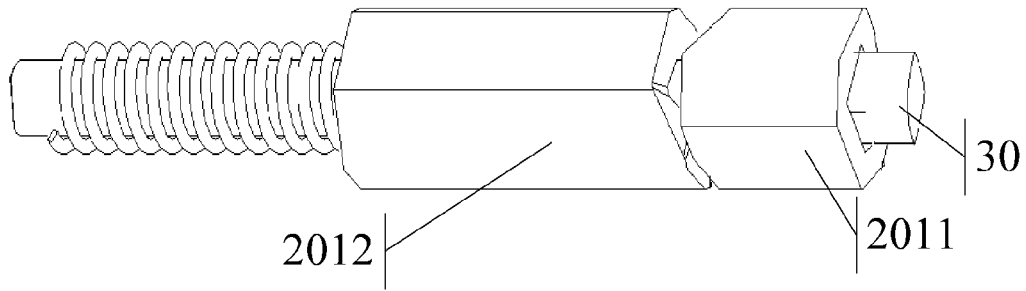

Specifically, in the case where the first body 10 rotates from the first relative position to the second relative position about the rotary shaft 30, the first engagement member 2021 rotates from the first position shown in FIG. 5A to the second position shown in FIG. 5B with respect to the second engagement member 2022, that is, the state in which the first engagement member 2021 is completely engaged with the second engagement member 2022 is switched into the state in which the first engagement member 2021 is completely not engaged with the second engagement member 2022. Meanwhile, the second engagement member 2022 is sliding towards the first facing away from the first engagement member 2021, i.e. the first direction, such that the second engagement member 2022 moves about 2 to 2.5 mm, or 1 to 3 mm, with respect to the rotary shaft 30. Because the linkage 2023 is disposed on the second engagement member 2022 and separately connected with the second coupling member 201, if the second engagement member 2022 slides, it would cause the second coupling member 201 to move toward the first direction by the linkage 2023. In this case, the second coupling member 201 decouples from the first coupling member 101 so that the first body 10 is separated from the second body 20.

In practice, the distance in which the above-mentioned second engagement member 2022 moves with respect to the rotary shaft 30 is depended on the structures of the first engagement member 2021 and the second engagement member 2022. Therefore, in the implementation, the distance may be determined by the skilled in the art as required and the embodiments of the present application are not limited thereto.

In the implementation, the first engagement member 2021 may include a first end provided with at least two recesses; a second engagement member 2022 including a second end and a third end different from the second end, the second end is provided with at least two protrusions 20221 which match the at least two recesses, and the linkage 2023 is provided on the third end. the at least two recesses and the at least two protrusions 20221 are in a first state in the case where the first engagement member 2021 is located in the first position with respect to the second engagement member 2022; and the at least two recesses and at least two protrusions 20221 are in a second state in the case where the first engagement member 2021 is located in the second position with respect to the second engagement member 2022, where the first state is different from the second state.

Figure 6:
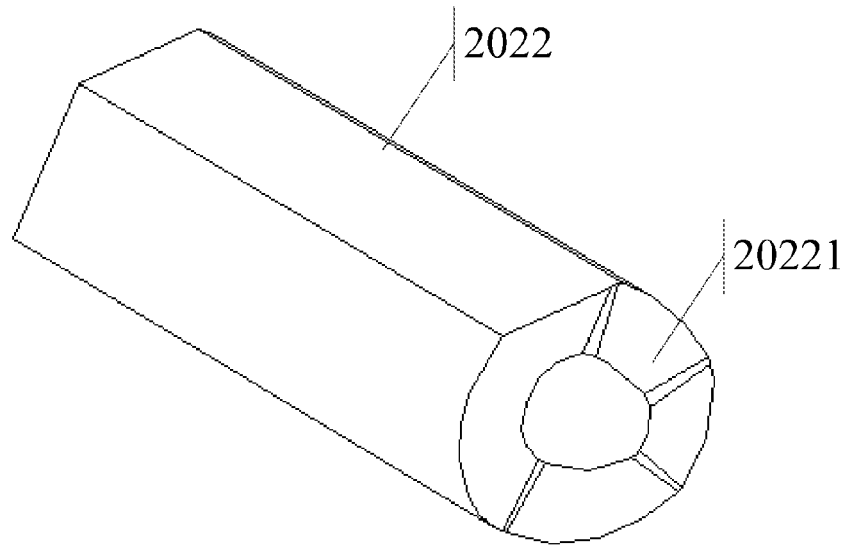
FIG. 6 is a schematic structural diagram of a contact surface of a second engagement member with a first engagement member according to an embodiment of the present application.

Specifically, the first end 401 of the first engagement member 2021 is provided with at least two recesses, and the second end of the second engagement member 2022 is provided with at least two protrusions 20221 which match the at least two recesses. In the case where the at least two protrusions 20221 are as shown in FIG. 6, in the process of the first engagement member 2021 rotating with respect to the second engagement member 2022, it is possible that the state in which the first engagement member 2021 is completely engaged with the second engagement member 2022, i.e. the first state, is gradually switched into the state in which the first engagement member 2021 is completely not engaged with the second engagement member 2022, i.e. the second state. Obviously, the at least two recesses may also have the other structure, as long as it is enabled to achieve that the state of completely engaging with each other is switched into the state of completely not engaging with each other during the rotation of the first engagement member 2021 with respect to the second engagement member 2022, and not limited in the embodiments of the present application.

Obviously, the second state may also be the state of partly engaging with each other, as long as it is enabled that the second engagement member 2022 slides towards the first direction with respect to the rotary shaft 30 by the cooperation between the at least two recesses and the at least two protrusions 20221.

In another embodiment, also as shown in FIG. 4, in order to make the second coupling member 201 to contact with the linkage 2023 tightly, an elastic member is provided on the rotary shaft 30 and connected with the third end of the second engagement member 2022, and also an elastic member is provided on a side of the second coupling member 201. In this way, the two elastic members enable the linkage 2023 to contact with the second coupling member 201 tightly in the case where the linkage 2023 causes the second coupling member 201 to move.

Furthermore, in order to improve the experience of the user and enable to separate the first body 10 from the second body 20 without great effort of the user, the second body 20 further includes a force application mechanism configured for providing a first acting force to the first body 10 in the case where the first body 10 and the second body 20 are located in the second relative position, leading to the decouple and the separation of the first body 10 and the second body 20. In practically, the force application mechanism may be a ring or a scissor-switch and the like and the embodiments of the present application are not limited thereto.

The working process of the electronic device is described in detail as follow.

Figure 7A:
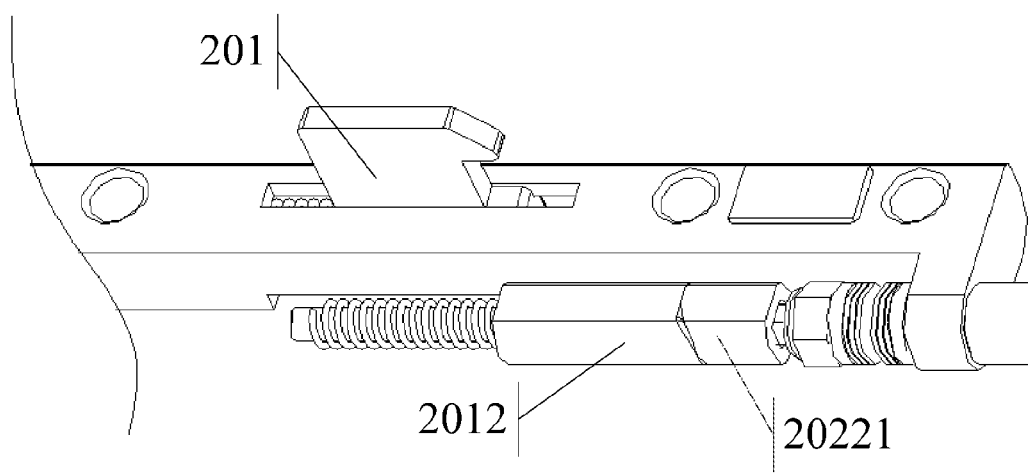
FIGS. 7A to 7B are diagrams showing the states of a first cam in the case where a first body and a second body are located at different relative positions according to an embodiment of the present application.
Figure 7B:
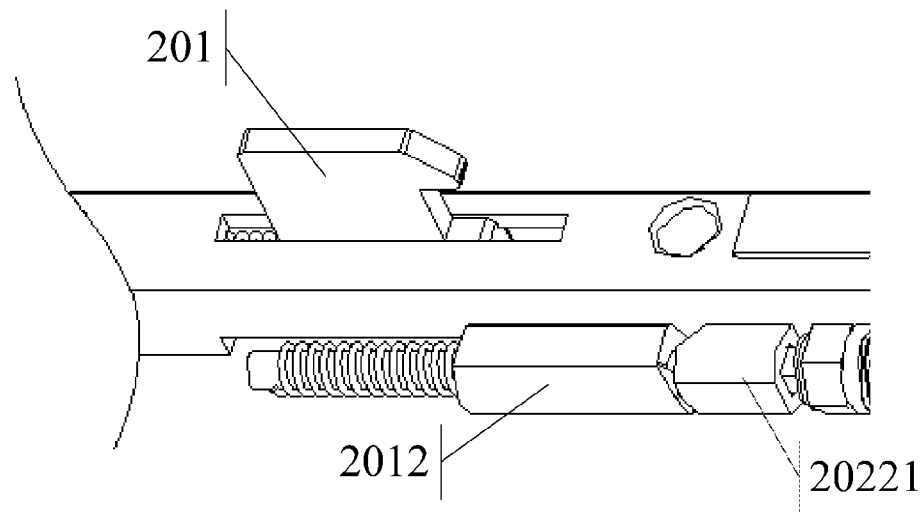

In the case where the user intends to couple the first body 10 with the second body 20, the N first coupling members 101 are aligned with and then inserted into the second coupling members 201 by the user. After the first coupling members 101 is coupled with the second coupling members 201, the first body 10 is in the first relative position with respect to the second body 20, as shown in FIG. 7A (the other side of curve in FIG. 7A is other function component). Furthermore, the user may adjust the angle of the first body 10 and the second body 20 as the will of the user, and all of the relative positions between the first body 10 and the second body 20 may be considered as the first relative position. Then, in the case where the user intends to separate the first body 10 from the second body 20, the first body 10 is rotated with respect to the second body 20 by the user, and the second coupling member 201 may move together with the first body 10, causing the second engagement member 2022 to rotate about the rotary shaft 30. Then in the following rotation, the first engagement member 2021 rotates with respect to the second engagement member 2022, and the second engagement member 2022 is squeezed towards the first direction slowly along the contact surface of the two engagement members, such that the second engagement member 2022 moves a certain distance towards the first direction along the rotary shaft 30. The second coupling member 201 is affected by the linkage 2023 provided on the second engagement member 2022 and moves towards the first direction. In the case where the first body 10 and the second body 20 reach to the second relatively position, the first engagement member 2021 is completely not engaged with the second engagement member 2022, that is, the second engagement member 2022 is squeezed to the greatest extent, and also the second coupling member 201 is also caused to move by the linkage 2023 as far as possible with respect to the first coupling member 101, and decoupled from the first coupling member 101, as shown in FIG. 7B (the other side of curve in FIG. 7B is other function component). In this way, if the first acting force is applied to the first body 10 by the user, the first body 10 would be extracted from the second body 20 easily. Of course, the first body 10 may also be ejected by the force application mechanism. In this way, it is enable to separate the first body 10 from the second body 20 without great effort of the user.

Then, the couple and the separation of the first body 10 and the second body 20 on the electronic device are achieved.

The following can be seen from the above description. In the case where the first body and the second body keep in contact with each other, if the first body and the second body are located in the first relative position, the first body and the second body can be coupled together as an integral piece by the cooperation between the N first coupling members and the N second coupling members. In this case, if a first acting force is applied to the first body in a direction facing away from the second body, the first body and the second body are not separated from each other. Moreover, if the first body and the second body are located in the second relative position, the first body and the second body can be decoupled from each other but remain in contact with each other, by the cooperation between the N first coupling members and the N second coupling members. In this case, if the above-mentioned first acting force is applied to the first body, the first body and the second body are separated from each other. Therefore, when separating the first body from the second body, the user only has to adjust the relative position between the first body and the second body into the second relative position without using very large force and then the first body and the second body can be easily separated from each other. In this way, the service life of the electronic device is improved.

Furthermore, the user can use a smaller force to easily separate the first body from the second body, leading to a good user experience. Furthermore, the first body is movable with respect to the second body in the first mode and in the second mode different from the first mode, where the first body and the second body are decoupled from each other, if the first body moves in the first mode from the first relative position to the second relative position with respect to the second body; and the first body and the second body remain coupled, if the first body moves in the second mode from the first relative position to the second relative position with respect to the second body. That is to say, there are multiple ways for adjusting the first body and the second body to be located from the first relative position to the second relative position. However, the first body can only be decoupled and separated from the second body in the case where the first body and the second body are located in the second relative position, only if the first body moves in the first mode. When the first body moves in the second mode to be located in the second relative position with respect to the second body, the first body and the second body remain in connection with each other as the integral piece. In this way, the reliability in the couple between the first body and the second body is improved and the user does not have to worry that the first body may separate from the second body and the operation of the user is affected when the user moves the first body in the second mode, thereby improving the user experience. In the case where the first body and the second body are continuously rotatable about the rotary shaft from the first relative position to the second relative position via at least one transition position between the first relative position and the second relative position, the first body and the second body are decoupled from each other, so that the first body is separable from the second body. That is to say, the first body and the second body are decoupled and separated from each other only if the first body and the second body are continuously rotated. Moreover, the first body and the second body remain in couple with each other and are not separable, if the first body and the second body are directly adjusted from the first relative position to the second relative position without the continuous rotation. In this way, the reliability in the couple between the electronic device first body and the second body is improved, thereby improving the user experience.

In addition, according to the embodiment of the present application, it is provided another electronic device, to improve the structure of a connecting mechanism of the existing electronic device, and to ensure that the connecting structure for locking and unlocking conforms to the design trend of being lighter and thinner.

This embodiment is described in detail taken the electronic device consisting of a tablet PC (a first body) and a base (a second body) as the subject. It should be understood that a connecting mechanism serving as the one connecting the two bodies of the electronic device can also be adapted to other electronic devices in which bodies are detachably connected, and a first body is articulated to a second body when in a connected state.

Figure 9:
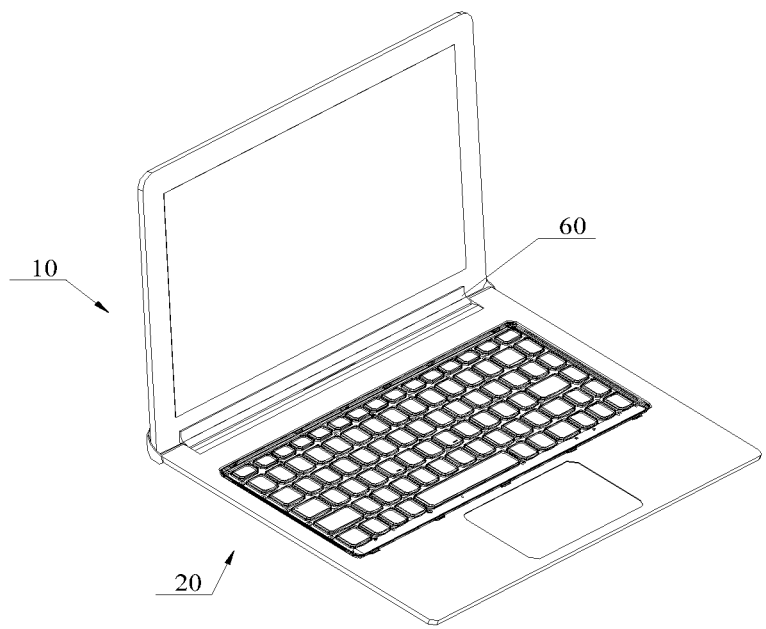
FIG. 9 is a schematic axonometrical view of an electronic device according to an embodiment of the present application in an opened state.
Figure 10:
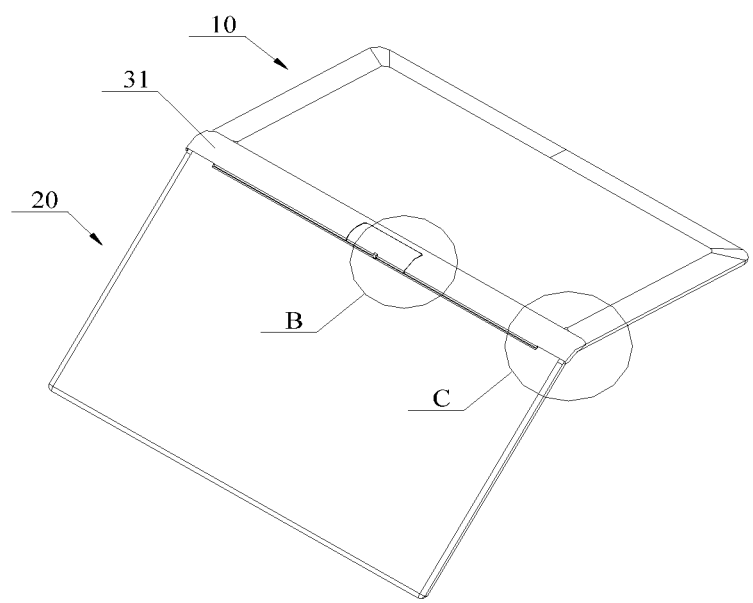
FIG. 10 is a schematic axonometrical view of the electronic device shown in FIG. 1 at another angle.
Figure 11:
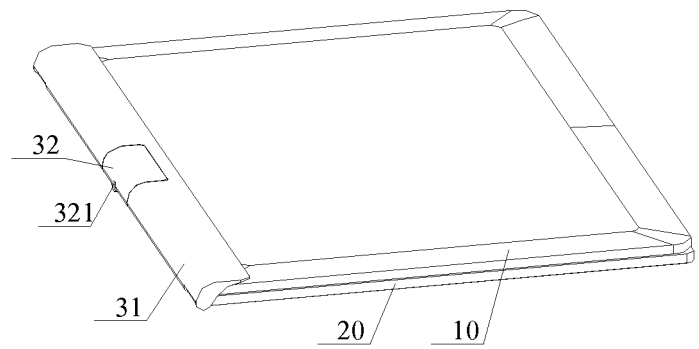
FIG. 11 is a schematic axonometrical view of an electronic device according to an embodiment of the present application in a closed state.

FIG. 9 is a schematic axonometrical view of the electronic device according to this embodiment in an open state, FIG. 10 is a schematic axonometrical view of the electronic device shown in FIG. 9 at another angle, and FIG. 11 is a schematic axonometrical view of the electronic device according to this embodiment in a close state.

Apparently, the electronic device with the base 20 (the second body) and the tablet PC 10 (the first body) connected to each other as shown in FIGS. 9 to 11 may be in an usage mode of laptop PC. In this state, the tablet PC 10 is articulated to the base 20, and mainly presents its function of display. Apparently, both a touch display screen of the tablet PC 10 and a keyboard means of the base 20 can be used for command input, comparatively, text input with relatively higher efficiency can be achieved by the keyboard means.

Figure 12:
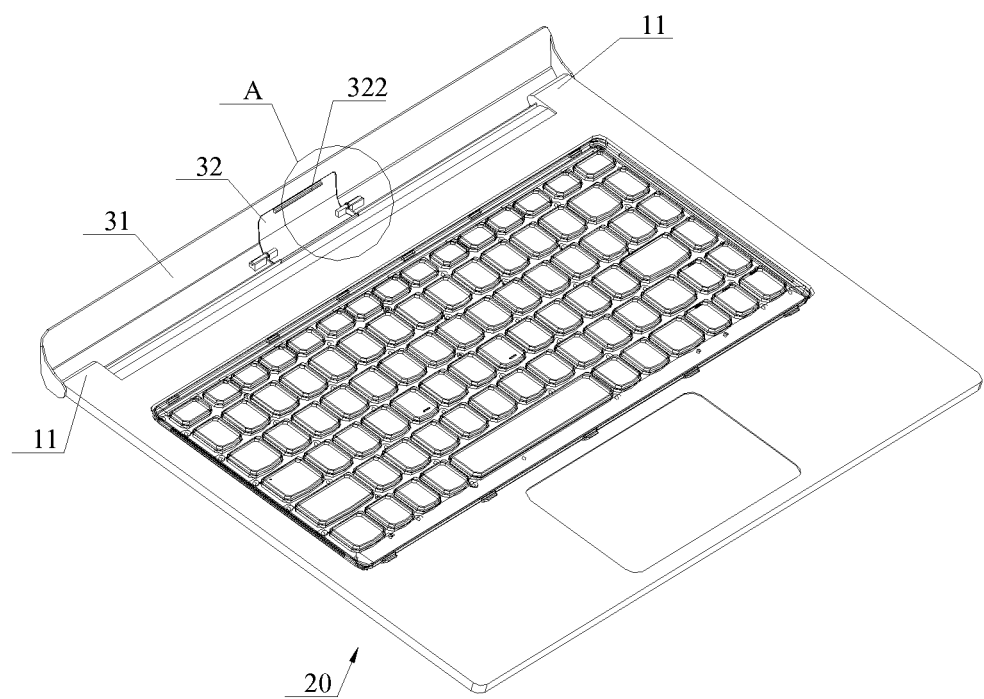
FIG. 12 is a schematic view showing the assembling relationship between a connecting mechanism and a base.
Figure 13:
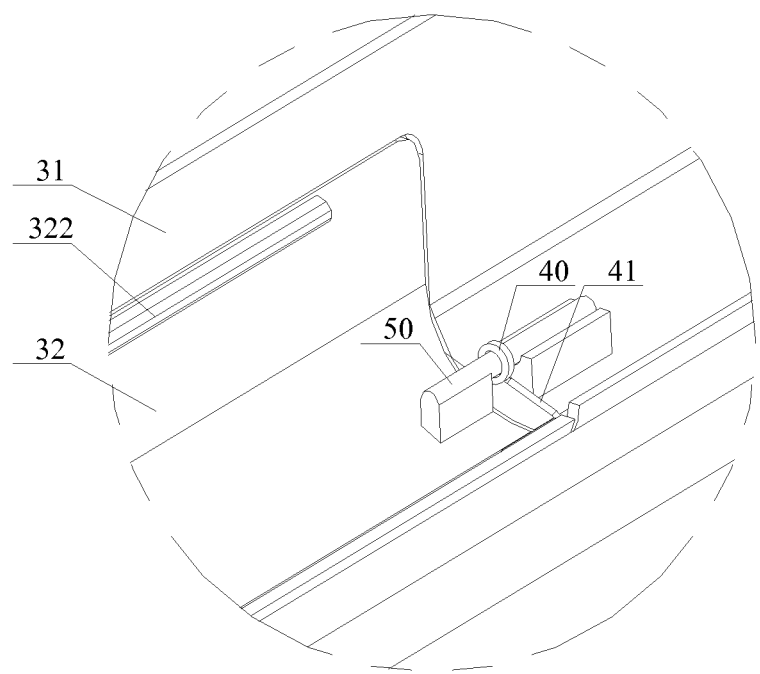
FIG. 13 is a schematic enlarged view of part A in FIG. 12.
Figure 14:
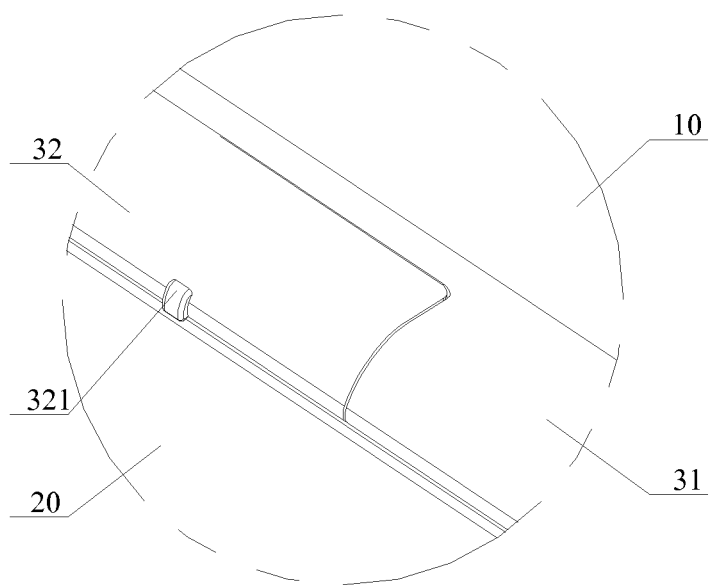
FIG. 14 is a schematic enlarged view of part B in FIG. 10.

The connection between the base 20 and the tablet PC 10 is achieved by the connecting mechanism 30 in this solution. Reference may be specifically made to FIGS. 12, 13 and 14, in which FIG. 12 shows a schematic view of an assembling relationship between the connecting mechanism and the base 20, FIG. 13 is a schematic enlarged view of part A in FIG. 12, and FIG. 14 is a schematic enlarged view of part B in FIG. 10.

As is shown in the drawings, the connecting mechanism 30 mainly includes a first coupling member 31 and a second coupling member 32. The first coupling member 31 is articulated to the base 20, and also an inserting portion for receiving the tablet PC 10 insertingly mounted is formed between the first coupling member 31 and the base 20 at the articulating side, such that the operating attitude of the tablet PC 10 can be adjusted by means of rotating the first coupling member 31 relative to the base 10. The second coupling member 32 is articulated to the first coupling member 31, and the second coupling member 32 can be rotatably switched between an unlocking position and a locking position relative to the first coupling member 31.

In the connected state, the tablet PC 10 is insertingly mounted to the inserting portion, and the second coupling member 32 when in the locking position is engagingly fixed to the tablet PC 10 via fitted engaging structures to further improve connection stability between the tablet PC 20 and the base 20. Also, the second coupling member 32 is provided with an unlocking protruding portion 321, and is configured as: with the tablet PC 10, the first coupling member 31 and the second coupling member 32 rotating synchronously to a preset opening-closing angular position, the unlocking protruding portion 321 abuts against the base 20, forming a torque for driving the second coupling member 32 to rotatably switch to the unlocking position, and the engaging structures between the tablet PC 10 and the second coupling member 32 when in the unlocking position disengage from each other.

To further ensure that the connection between the base 20 and the tablet PC 10 in the locking state is more reliable, an elastic component for holding the second coupling member 32 in the locking position may be provided. As shown in FIGS. 12 and 13, the elastic component 40 releases elastic deformation energy to the second coupling member 32, such that the second coupling member 32 is held in the locking position with respect to the first coupling member 31. In the actual application, the elastic component 40 may be achieved as desired by various structures, such as, compression springs, torsion springs and elastic rubber parts, or the like. A means of more compact, lower manufacturing cost, i.e. a torsion spring is employed in this embodiment.

As shown in FIG. 13 in detail, the first coupling member 31 and the second coupling member 32 are articulated via an articulating shaft 50. A torsion spring serving as the elastic component is sleeved on the articulating shaft 50. A spring leg 41 of the torsion spring abuts against the second coupling member 32 so as to enable the torsion spring to further store elastic deformation energy when the second coupling member 32 is rotatably switched to the unlocking position, for making the second coupling member 32 return to the locking position. As will be appreciated, abutment relationship of another spring leg of the torsion spring can be determined according to the actual connection between the articulating shaft 50 and the first coupling member 31. If the articulating shaft 50 is fixedly connected with the first coupling member 31, the another spring leg of the torsion spring either can fixedly abut against the articulating shaft 50, or can abut against the first coupling member 31; if the articulating shaft 50 is pivotally connected with the first coupling member 31, the another spring leg of the torsion spring can only abut against the first coupling member 31. Selection criterion of abutment relationship of another spring leg of the torsion spring is that the torsion spring is capable of further storing elastic deformation energy when the second coupling member 32 is rotatably switched to the unlocking position.

Inserting and locking procedures and unlocking and removing procedures of the tablet PC are explained hereinafter in conjunction with section diagrams formed at the engaging mechanism.

Inserting and Locking Procedures.

Figure 16:
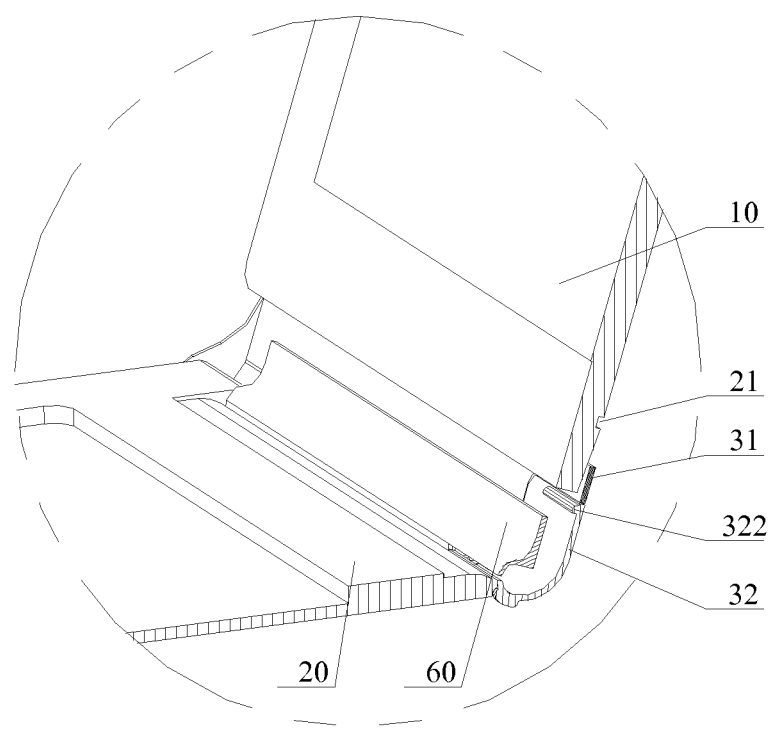
FIGS. 16 to 19 are schematic sectional views showing procedures in inserting and locking operation.
Figure 17:
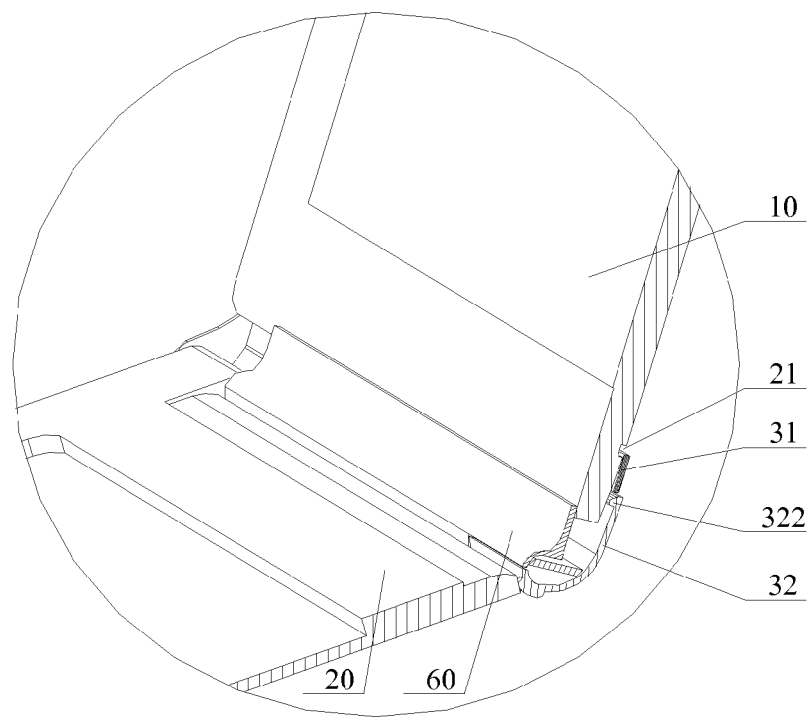
Figure 18:
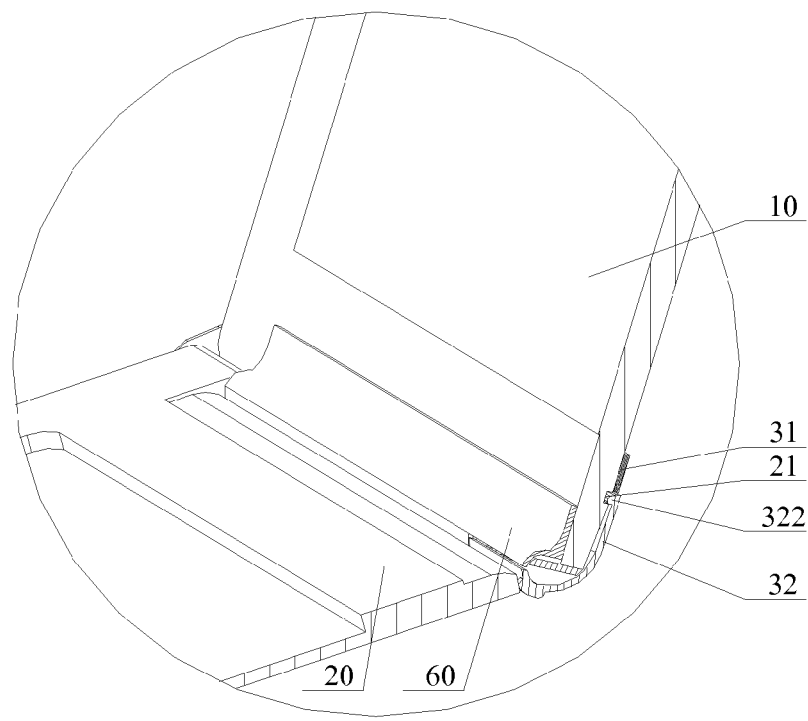
Figure 19:
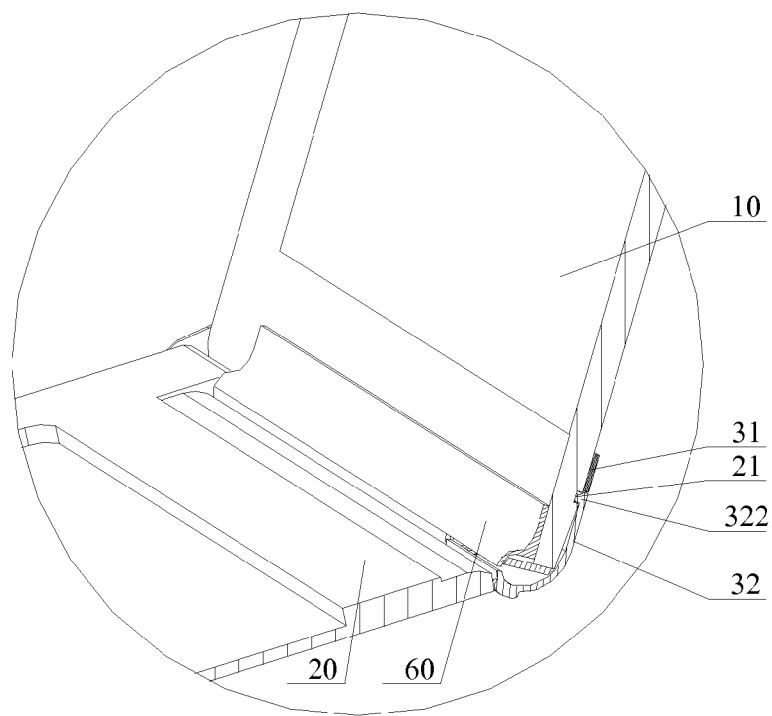

As shown in FIG. 16, in the case where the tablet PC 10 is not connected to the base 10, the second coupling member 32 is located in the locking position with respect to the first coupling member 31. When the tablet PC 10 is placed into the inserting portion of the first coupling member 31 by a user till the bottom surface of the tablet PC 10 contacting with the outer bump 322 of the engaging mechanism on the second coupling member 32, the second coupling member 32 is pushed against to the outside gradually, i.e. as shown in FIG. 17, the second coupling member 32 is overturned to the outside (equivalent to be switched to the unlocking position) with respect to the first coupling member 31. As shown in FIG. 18, the tablet PC 10 continues to enter into the inserting portion till being fully inserted in position as shown in FIG. 19. The second coupling member 32 automatically turns under the action of the elastic component 40, such that the outer bump 322 on the second coupling member 32 enters into the inner recess 21 of the engaging mechanism on the tablet PC 20, as shown in FIG. 20, the second coupling member 32 is thus switched to the locking position, locking of the tablet PC 10 is realized.

Unlocking and Removing Procedures.

Figure 20:
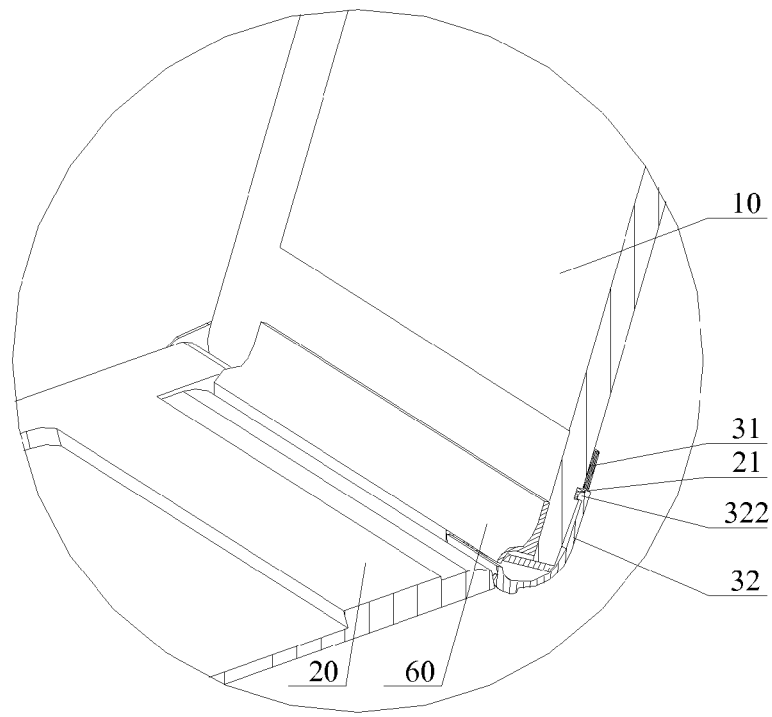
FIGS. 20 to 22 are schematic sectional views showing procedures in unlocking and removing operation.
Figure 21:
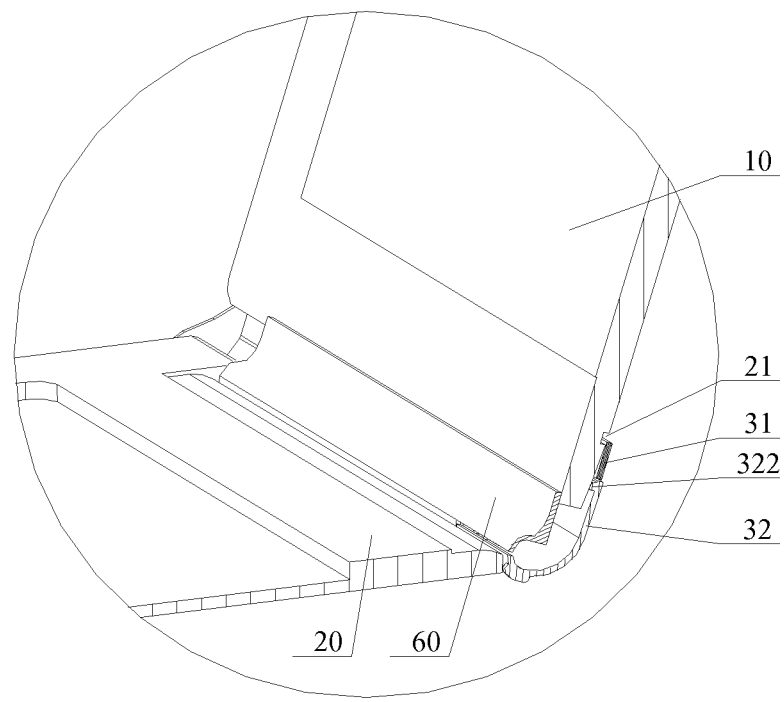
Figure 22:
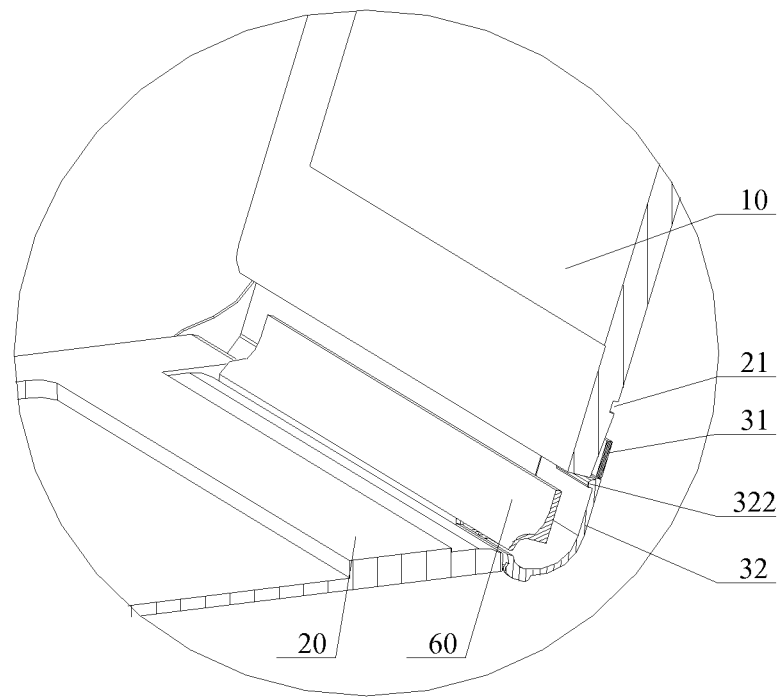

In the case where the tablet PC 10 is required to be removed from the base 20, the tablet PC 10 is overturned to approach the preset opening-closing angle by a user, as shown in FIG. 20, the unlocking protruding portion 321 on the second coupling member 32 contacts with the front of the base 20, and then pushes the second coupling member 32 to the outside by a force. That is the second coupling member 32 is overturned to the outside with respect to the first coupling member 31, such that the outer bump 322 on the second coupling member 32 is gradually rotatably disengaged from the inner recess 21 on the tablet PC 10. With the tablet PC 20 being rotated to a preset limit angle, the outer bump 322 is fully disengaged from the inner recess 21, as shown in FIG. 21, and the second coupling member 32 is switched to the unlocking position. Fully unlocking of the tablet PC 10 is thus realized. Thereby, tablet PC 10 can be easily removed by a user, as shown in FIG. 22, and also in this state, the second coupling member 32 automatically turns to the locking position under the action of the elastic component 40.

It is to be noted that, the engaging mechanism described above consists of an inner recess 21 on the tablet PC 10 and an outer bump 322 on the second coupling member 32 fitted with the inner recess 21. Obviously, a locking relationship established thereby is not limited to such arrangement, a reversed arrangement can also meet the function requirement of the locking engagement, i.e., with the inner recess and the outer bump fitted to each other, the outer bump is arranged on the tablet PC, and the inner recess is arranged on the second coupling member.

Figure 15:
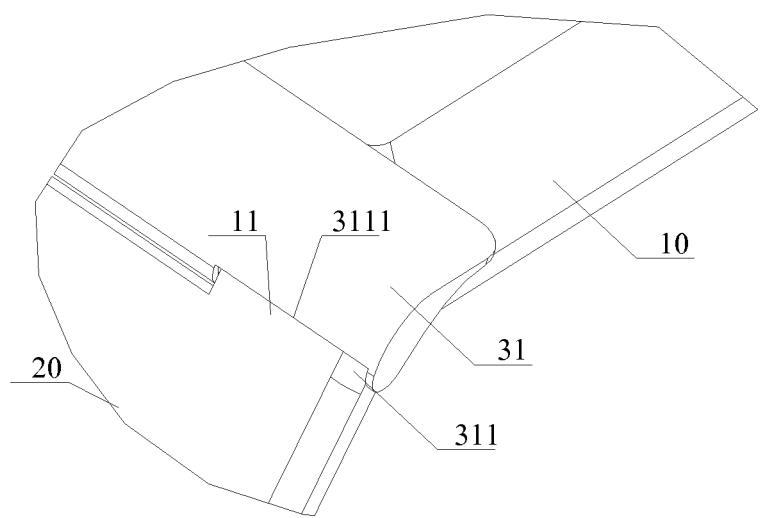
FIG. 15 is a schematic enlarged view of part C in FIG. 10.

In addition, the articulation relationship between the first coupling member 31 and the base 20 may also be achieved in various ways. As shown in the drawings, the first coupling member 31 and the base 20 are articulated to each other along the articulating side edges of the base 20 and the tablet PC 10 at two side ends. Correspondingly, the articulating side edge of the first coupling member 31 is provided with an accommodating portion 311, and the articulating side edge of the base 20 is provided with an outer projection 11 for being placed into the accommodating portion 311. In the case where the second coupling member 32 rotates to a preset opening-closing angular position, as shown in FIGS. 10 and 15, the bottom edge of the accommodating portion 311 on the first coupling member 31 abuts against the outer surface of the base 20 for position limiting. According to the arrangement, the structure is relative simpler and more compact, and the user can feel directly the reaction force produced when the bottom edge 3111 of the accommodating portion 311 abuts against the outer surface of the outer projection 11 of the base 20, and thereby accurately perceives that the disengagement of the engaging mechanism has been completed, and a good user experience can be achieved.

To have a better appearance effect, the compact design of the structural components can be further enhanced. As shown in the drawings, the second coupling member 32 is embeddingly provided in a middle portion of the first coupling member 31, that is to say, an accommodating space is formed in the middle portion of the first coupling member 31 by removing some material, the second coupling member 32 when in the locking position has an outer circumferential surface in a shape accordant with that of the first coupling member 31. That is to say, in a natural state, the outer surface of the second coupling member 32 is flush with the outer surface of the first coupling member 31.

In addition, an improvement may be further made for the junction between the outer surfaces of the tablet PC 10 and the first coupling member 31. Practically, an outer surface of the tablet PC 10 at the articulating side may be provided with an inner concave portion (not shown). The inner concave portion of the tablet PC 10 when in the connected state is embeddingly mounted with the first coupling member 31, and the first coupling member 31 has an outer circumferential surface in a shape accordant with that of the tablet PC 10, which further enhances the appearance effect of the electronic device when in a laptop PC usage mode. Apparently, the inner concave portion has to be exposed when the electronic device is in the usage mode of the tablet PC 10 according to this solution.

Further, to avoid the intersection of the first coupling member 31, the tablet PC 10 and the base 20 from accumulating dust and litter, an enclosing member 60 may be provided at a side of the first coupling member 31 facing the base 20, and the enclosing member 60 may also be used as a structure forming the receiving portion described above.

Compared with the prior art, connecting mechanism between two bodies of the electronic device is structurally optimized in another way in the present application, a body constitution of the connecting mechanism is independent of the second body, locking and unlocking of the two bodies are both realized by a member having rotational displacement trajectory, which provides a reliable guarantee for overall design of being lighter and thinner. Specifically, two connectors of the connecting mechanism are articulated to each other, the second connector may be rotatably switched between an unlocking position and a locking position with respect to the first connector, and the first connector is articulated to the first body, with a receiving portion being formed between the first connector and the first body at the articulating side of the first connector. In the connected state, the second body is inserted into the receiving portion, and the second connector when in the locking position is engagingly fixed to the second body via fitted engaging structures. The electronic device in the connected state is of a usage mode, the first body and the second body can be articulated to each other by this connecting structure to allow the closing angle to be adjusted. Also, the second connector is provided with an unlocking protruding portion. When the connection between the first body and the second body is required to be released, i.e., when one body is required to be separated from the other so as to be in another usage mode, the second body can be rotated manually to open. With the first body, the first connector, and the second connector rotating synchronously to a preset closing angular position, the unlocking protruding portion on the second connector can abut against the first body, thereby forming a torque for driving the second connector to switch the position, i.e., to rotatably switch to the unlocking position with respect to the first connector, such that the engaging structures between the second body and the second connector in the unlocking position disengage from each other, and thus completing the separate operation of the first body from the second body. The connecting mechanism according to the present application has characteristics of reasonable design and high reliability of operation.

Figure 8:
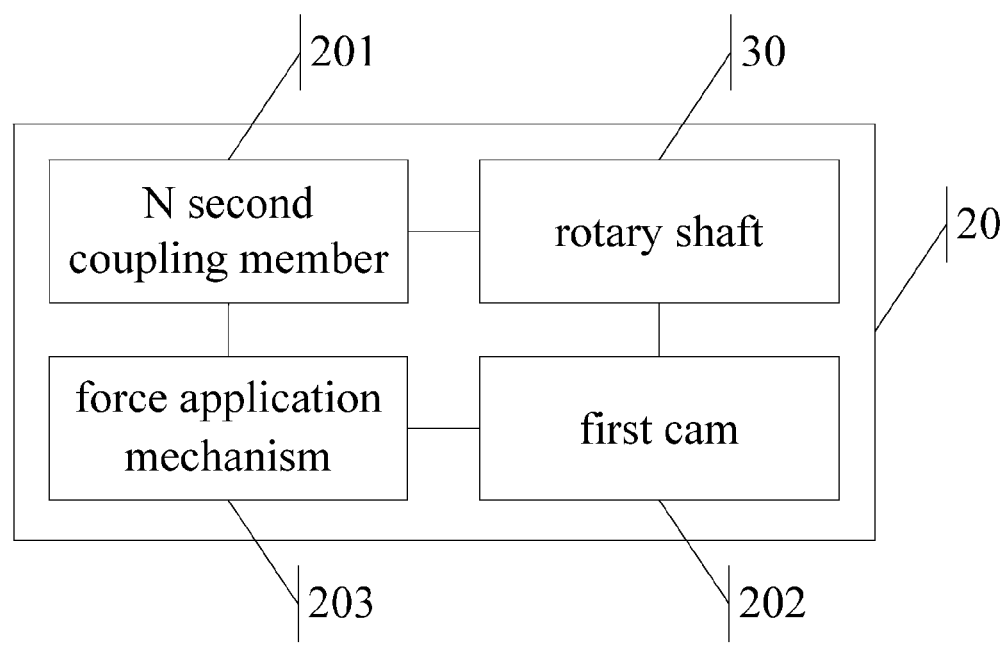
FIG. 8 is a schematic structural diagram of a docking station according to an embodiment of the present application.

In another aspect, there is provided a docking station separably connected to the electronic device through another embodiment of the present application, based on the same inventive concept. The docking station 20 is consistent with the above-mentioned second body, and the electronic device is consistent with the first body 10. The docking station may also be used as the input unit of the electronic device. The electronic device is provided with N first coupling members, N is an integer greater than or equal to 1, as shown in FIG. 8. The docking station includes: N second coupling members 201 which match the N first coupling members, in the case where the electronic device keeps in contact with the docking station, and the electronic device and the docking station are located in the first relative position, the electronic device and the docking station are coupled together by cooperation between the N first coupling members and the N second coupling members 201; and if the electronic device and the docking station are located in a second relative position different from the first relative position, the electronic device and the docking station are decoupled from each other by cooperation between the N first coupling members and the N second coupling members 201, so that the electronic device is separable from the docking station.

Furthermore, the electronic device is movable with respect to the docking station in the first mode and in the second mode different from the first mode. The electronic device and the docking station are decoupled from each other, if the electronic device moves in the first mode from the first relative position to the second relative position with respect to the docking station; and the electronic device and the docking station remain coupled, if the electronic device moves in the second mode from the first relative position to the second relative position with respect to the docking station.

Furthermore, in the case where the first body moves in the first mode from the first relative position to the second relative position with respect to the second body, the N first coupling members are switched from the first state to the second state different from the first state to be decoupled from the N second coupling members 201, leading to the decouple of the electronic device and the docking station.

Furthermore, as shown in FIG. 8, the docking station further includes a rotary shaft 30 disposed on a first side of the N second coupling members 201, and the electronic device is rotatable about the rotary shaft from the first relative position to the second relative position with respect to the docking station in the case where a first body keeps in contact with a second body.

Furthermore, electronic device and the docking station are continuously rotatable about the rotary shaft 30 from the first relative position to the second relative position via at least one transition position between the first relative position and the second relative position, the electronic device and the docking station are decoupled from each other, so that the electronic device is separable from the docking station.

Furthermore, as shown in FIG. 4, the docking station further includes a first cam 202 sleeved on the rotary shaft 30. The first cam 202 includes: a first engagement member 2021; a second engagement member 2022; and a linkage 2023 disposed on the second engagement member 2022 and separably connected to the second coupling member 201. in the case where the electronic device rotates from the first relative position to the second relative position with respect to the docking station, the first engagement member 2021 rotates from the first position to the second position with respect to the second engagement member 2022, such that the second engagement member 2022 relatively slides with respect to the rotary shaft towards a first direction and causes, by the linkage 2023, the second coupling member 201 to slide towards the first direction, leading to the couple of the first coupling member 101 and the second coupling member 201, so that the electronic device is separable from the docking station.

Furthermore, the first engagement member 2021 includes a first end provided with at least two recesses. The second engagement member 2022 includes a second end and a third end different from the second end, the second end is provided with at least two protrusions which match the at least two recesses, and the linkage 2023 is provided on the third end. The at least two recesses and the at least two protrusions are in a first state, in the case where the first engagement member 2021 is located in the first position with respect to the second engagement member 2022; and the at least two recesses and the at least two protrusions are in a second state, in the case where the first engagement member 2021 is located in the second position with respect to the second engagement member 2022, where the first state is different from the second state.

Furthermore, the docking station further includes a force application mechanism 203 configured for providing a first acting force to the electronic device in the case where the electronic device and the docking station are located in the second relative position, leading to decouple and separation of the electronic device and the docking station.

The working process of the docking station and the electronic device is consist with the working process of the first body 20 and the second body 10, which is not repeated herein.

According to the electronic device provided in the embodiments of the present application, there are at least the following technical effects or advantages.

1. In the case where the first body and the second body keep in contact with each other, and the first body and the second body are located in the first relative position, the first body and the second body can be coupled together as an integral piece by the cooperation between the N first coupling members and the N second coupling members. In this case, if a first acting force is applied to the first body in a direction facing away from the second body, the first body and the second body are not separated from each other. Moreover, if the first body and the second body are located in the second relative position, the first body and the second body can be decoupled from each other but remain in contact with each other, by the cooperation between the N first coupling members and the N second coupling members. In this case, if the above-mentioned first acting force is applied to the first body, the first body and the second body are separated from each other. Therefore, when separating the first body from the second body, the user only has to adjust the relative position between the first body and the second body into the second relative position without using very large force and then the first body and the second body can be easily separated from each other. In this way, the technical problem in the prior art that the electronic device can not withstand excessive force acting on the auxiliary device by the user and is damaged during the separation of the electronic device and the auxiliary device in the case where the spring and the engagement mechanism are adopted to couple the electronic device and the auxiliary device is effectively solved, improving the service life of the electronic device. Furthermore, the user can use a smaller force to easily separate the first body from the second body, leading to a good user experience.

2. The first body is movable with respect to the second body in the first mode and in the second mode different from the first mode. The first body and the second body are decoupled from each other, if the first body moves in the first mode from the first relative position to the second relative position with respect to the second body; and the first body and the second body remain coupled, if the first body moves in the second mode from the first relative position to the second relative position with respect to the second body. That is to say, there are multiple ways for adjusting the first body and the second body to be located from the first relative position to the second relative position. However, the first body can only be decoupled and separated from the second body when the first body and the second body are located in the second relative position, only if the first body moves in the first mode. In the case where the first body moves in the second mode to be located in the second relative position with respect to the second body, the first body and the second body remain in connection with each other as the integral piece. In this way, the reliability in the couple between the first body and the second body is improved and the user does not have to worry that the first body may separate from the second body and the operation of the user is affected when the user moves the first body in the second mode, thereby improving the user experience.

3. In the case where the first body and the second body are continuously rotatable about the rotary shaft from the first relative position to the second relative position via at least one transition position between the first relative position and the second relative position, the first body and the second body are decoupled from each other, so that the first body is separable from the second body. That is to say, the first body and the second body are decoupled and separated from each other only if the first body and the second body are continuously rotated. Moreover, the first body and the second body remain in couple with each other and are not separable, if the first body and the second body are directly adjusted from the first relative position to the second relative position without the continuous rotation. In this way, the reliability in the couple between the electronic device first body and the second body is improved, thereby improving the user experience.

In addition, according to the present application, it is also provided another docking station for being detachably connected to the tablet PC by a connecting mechanism. The connecting structure between the docking station and the tablet PC and their working principle are exactly the same as that of the tablet PC and the base of the electronic device described above. Reference can be made to the content disclosed in FIGS. 9 to 22 in order for the application document to be clearer and simpler.

As shown in FIG. 12, a connecting mechanism 30 for carrying the tablet PC 10 is provided on the body 10 of the docking station. The connecting mechanism 30 mainly includes the first coupling member 31 and the second coupling member 32 articulated to each other. Specifically, the first coupling member 31 is articulated to the body 10 of the docking station, and a inserting portion is formed between the first coupling member 31 and the body 10 of the docking station at the articulating side; and the second coupling member 32 is rotatably switched between the unlocking position and the locking position with respect to the first coupling member 31. In the case where the tablet PC and the docking station are required to be connected for use, the inserting portion is configured to receive the tablet PC in the insertingly connected state, and the second coupling member 32 in the locking position can engagingly fix the tablet PC 10 insertingly mounted in the docking station. In this usage mode, the tablet PC 10 can be articulated to the docking station by this connecting mechanism 30 to allow the closing angle to be adjusted.

Also, the second coupling member 32 is provided with an unlocking protruding portion 321. In the case where the tablet PC 10 and the docking station are required to be disconnected, i.e., the tablet PC 10 is in a separate usage mode, the user can manually rotate the tablet PC to perform the opening operation. With the first coupling member 31, the second coupling member 32 and the tablet PC 10 rotating synchronously to a preset closing angular position, the unlocking protruding portion 321 abuts against the body 10 of the docking station, thereby forming a torque for driving the second coupling member 32 to rotatably switch to the unlocking position, such that the second coupling member 32 in the unlocking position can unlock the tablet PC 10, and thus completing the separate operation of the tablet PC 10 from the docking station.

Further, the connecting mechanism 30 includes an elastic component 40 for releasing elastic deformation energy to the second coupling member 32 so as to allow the second coupling member 32 to be kept in the locking position with respect to the first coupling member 31, thereby ensuring that the connection between the docking station and the tablet PC 10 in a locking state can be more reliable. Preferably, the first coupling member 31 is articulated to the second coupling member 32 via an articulating shaft 50 arranged, and the elastic component 40 is a torsion spring sleeved on the articulating shaft 50. A spring leg of the torsion spring abuts against the second coupling member 32 so as to allow the elastic deformation energy to be stored when the second coupling member 32 is rotatably switched to the unlocking position. In this way, the structure can be more compact and the manufacturing cost can be relatively lower.

In addition, as shown in FIGS. 9 to 12, the docking station is connected to the tablet PC 10 to enable the electronic device to be in a laptop PC usage mode. In this state, the tablet PC 10 is articulated to the docking station and mainly presents a display function. Similarly, both of a touch display screen of the tablet PC 10 and the keyboard means of the docking station can be used for command input; comparatively, text input with relatively higher efficiency can be achieved by the keyboard means.

It is to be particularly noted that, the docking station according to this embodiment is not limited to be applied to carry the tablet PC, and can be used for function extension of any types of tablet electronic devices.

It is obvious that numerous modifications and equivalents can be made to the present application by the skilled in the art without deviation from the spirit and scope of the present application. The application intends to contain the modifications and equivalents made to the present application, as long as the modifications and equivalents are within the scope of the claims of the present application or the equivalent techniques.

What is claimed is:

1. An electronic device, comprising: a first body, a second body, a first coupling member and a second coupling member; wherein
 in the case where the first body and the second body are located in a first relative position, the first body and the second body are coupled together by cooperation between the first coupling member and the second coupling member; and in the case where the first body and the second body are located in a second relative position different from the first relative position, the first body and the second body are decoupled from each other by cooperation between the first coupling member and the second coupling member.

2. The electronic device as claimed in claim 1, wherein the first coupling member is provided on the first body, the second coupling member is provided on the second body.

3. The electronic device as claimed in claim 2, wherein the first body is movable with respect to the second body in a first mode or in a second mode different from the first mode; wherein the first body and the second body are decoupled from each other, in the case where the first body moves in the first mode from the first relative position to the second relative position with respect to the second body; and the first body and the second body remain coupled, in the case where the first body moves in the second mode from the first relative position to the second relative position with respect to the second body.

4. The electronic device as claimed in claim 3, wherein in the case where the first body moves in the first mode from the first relative position to the second relative position with respect to the second body, the first coupling member is switched from a first state to a second state different from the first state to be decoupled from the second coupling member, leading to decouple of the first body and the second body.

5. The electronic device as claimed in claim 2, wherein the second body further comprises a rotary shaft disposed on a first side of the second coupling member; and the first body is rotatable about the rotary shaft from the first relative position to the second relative position with respect to the second body in the case where the first body keeps in contact with the second body.

6. The electronic device as claimed in claim 5, wherein in the case where the first body and the second body are rotatable about the rotary shaft from the first relative position to the second relative position via at least one transition position between the first relative position and the second relative position, the first body and the second body are decoupled from each other.

7. The electronic device as claimed in claim 6, wherein the second body further comprises a first cam sleeved on the rotary shaft, and the first cam comprises:
 a first engagement member;
 a second engagement member; and
 a linkage disposed on the second engagement member and separably connected to the second coupling member;
 wherein in the case where the first body rotates from the first relative position to the second relative position with respect to the second body, the first engagement member rotates from the first position to the second position with respect to the second engagement member, to facilitate the second engagement member relatively sliding with respect to the rotary shaft towards a first direction, and the second coupling member sliding towards the first direction by the linkage, such that the first coupling member and the second coupling member are decoupled from each other.

8. The electronic device as claimed in claim 6, wherein the first engagement member comprises a first end provided with at least two recesses;
 the second engagement member comprises a second end and a third end different from the second end, the second end is provided with at least two protrusions which match the at least two recesses, and the linkage is provided on the third end;
 wherein the at least two recesses and the at least two protrusions are in a first state, in the case where the first engagement member is located in the first position with respect to the second engagement member; and the at least two recesses and the at least two protrusions are in a second state, in the case where the first engagement member is located in the second position with respect to the second engagement member, wherein the first state is different from the second state.

9. The electronic device as claimed in claim 2, wherein the second body further comprises a force application mechanism configured to provide a first acting force to the first body in the case where the first body and the second body are located in the second relative position, to decouple and separate the first body and the second body.

10. The electronic device as claimed in claim 2, wherein in the case where the first body is located in the second relative position with respect to the second body, a ratio of transformation from external force acting on at least one of the first body and the second body by a user to a first acting force is greater than a first threshold, wherein the first acting force is the minimum force separating the first body from the second body.

11. The electronic device as claimed in claim 1, wherein
the first coupling member is articulated to the first body, and an inserting portion is formed between the first coupling member and the first body at an articulating side;
the second coupling member is articulated to the second coupling member, and the second coupling member is rotatably switched between an unlocking position and a locking position with respect to the first coupling member.

12. The electronic device as claimed in claim 11, wherein
in a coupling state, the second body is inserted into the inserting portion; in the locking position, the second coupling member is engagingly fixed to the second body via fitted engaging structures; the second coupling member is provided with an unlocking protruding portion, and is configured as: with the second body, the first coupling member and the second coupling member rotating synchronously to a preset opening-closing angular position, the unlocking protruding portion abuts against the first body, to form a torque for driving the second coupling member to rotatably switch to the unlocking position, and the engaging structures between the second body and the second coupling member separated from each other.

13. The electronic device as claimed in claim 12, further comprising:
an elastic component releasing elastic deformation energy to the second coupling member to facilitate the second coupling to keeping in the locking position with respect to the first coupling member.

14. The electronic device as claimed in claim 13, wherein the first coupling member and the second coupling member are articulated via an articulating shaft, the elastic component is a torsion spring sleeved on the articulating shaft, and a spring leg of the torsion spring abuts against the second coupling member to facilitate the second coupling member storing elastic deformation energy in the case where the second coupling member is rotatably switched to the unlocking position.

15. The electronic device as claimed in claim 12, wherein the first coupling member and the first body are articulated to each other along articulating side edges of the first body and the second body at two side ends; the articulating side edge of the first coupling member is provided with an accommodating part, and the articulating side edge of the first body has an outer projection for being placed in the accommodating portion; in the case where the second coupling member rotates to a preset opening-closing angular position, a bottom edge of the accommodating portion abuts against a outer surface of the first body for position limiting.

16. The electronic device as claimed in claim 15, wherein the second coupling member is embeddingly provided in a middle portion of the first coupling member, and the second coupling member has an outer circumferential surface in a shape accordant with that of the first coupling member in the case where the first body and the second body are in the coupling state.

17. The electronic device as claimed in claim 16, wherein an outer surface of the second body at the articulating side has an inner concave portion; in the coupling state, the inner concave portion of the second body is embeddingly mounted with the first coupling member, and the first coupling member has an outer circumferential surface in a shape accordant with that of the second body.

18. A docking station separably connected to an electronic device provided with a first coupling member, wherein the docking station comprises:
a second coupling member which matches the first coupling member; in the case where the electronic device and the docking station are located in a first relative position, the electronic device and the docking station are coupled together by cooperation between the first coupling member and the second coupling member; and in the case where the electronic device and the docking station are located in a second relative position different from the first relative position, the electronic device and the docking station are decoupled from each other by cooperation between the first coupling member and the second coupling member.

19. The docking station as claimed in claim 18, wherein the electronic device is movable with respect to the docking station in a first mode and or a second mode different from the first mode; wherein the electronic device and the docking station are decoupled from each other, in the case where the electronic device moves in the first mode from the first relative position to the second relative position with respect to the docking station; and the electronic device and the docking station remain coupled, in the case where the electronic device moves in the second mode from the first relative position to the second relative position with respect to the docking station.

20. The docking station as claimed in claim 19, wherein in the case where the electronic device moves in the first mode from the first relative position to the second relative position with respect to the docking station, the first coupling member is switched from a first state to a second state different from the first state to be decoupled from the second coupling member, leading to the decouple of the electronic device and the docking station.

21. The docking station as claimed in claim 18, wherein the docking station further comprises a rotary shaft disposed on a first side of the second coupling member, and the electronic device is rotatable about the rotary shaft from the first relative position to the second relative position with respect to the docking station in the case where the electronic device keeps in contact with the docking station.

22. The docking station as claimed in claim 21, wherein in the case where the electronic device and the docking station are rotatable about the rotary shaft from the first relative position to the second relative position via at least one transition position between the first relative position and the second relative position, the electronic device and the docking station are decoupled from each other.

23. The docking station as claimed in claim 21, wherein the docking station further comprises a first cam sleeved on the rotary shaft, and the first cam comprises:
a first engagement member;
a second engagement member; and
a linkage disposed on the second engagement member and separably connected to the second coupling member;
wherein in the case where the electronic device rotates from the first relative position to the second relative position with respect to the docking station, the first engagement member rotates from the first position to the second position with respect to the second engagement member, to facilitate the second engagement member relatively sliding with respect to the rotary shaft towards a first direction, and the second coupling member sliding towards the first direction by the linkage, such that the first coupling member and the second coupling member are decoupled from each other.

24. The docking station as claimed in claim 23, wherein the first engagement member comprises a first end provided with at least two recesses;

the second engagement member comprises a second end and a third end different from the second end, the second end is provided with at least two protrusions which match the at least two recesses, and the linkage is provided on the third end;

wherein the at least two recesses and the at least two protrusions are in a first state, in the case where the first engagement member is located in the first position with respect to the second engagement member; and the at least two recesses and the at least two protrusions are in a second state, in the case where the first engagement member is located in the second position with respect to the second engagement member, wherein the first state is different from the second state.

25. The docking station as claimed in claim 18, wherein the docking station further comprises a force application mechanism configured to provide a first acting force to the electronic device in the case where the electronic device and the docking station are located in the second relative position, to decouple and separate the electronic device and the docking station.

26. The docking station as claimed in claim 18, wherein in the case where the electronic device is located in the second relative position with respect to the docking station, a ratio of transformation from external force acting on at least one of the electronic device and the docking station by a user to a first acting force is greater than a first threshold, wherein the first acting force is the minimum force separating the electronic device from the docking station.

27. The docking station as claimed in claim 18, wherein
the first coupling member is articulated to a body of the docking station, and an inserting portion is formed between the first coupling member and the docking station at an articulating side;
the second coupling member is articulated to the second coupling member, and the second coupling member is rotatably switched between an unlocking position and a locking position with respect to the first coupling member;
wherein
in a coupling state, the electronic device is inserted into the inserting portion; in the locking position, the second coupling member is engagingly fixed to the electronic device via fitted engaging structures; the second coupling member is provided with an unlocking protruding portion, and is configured as: with the electronic device, the first coupling member and the second coupling member rotating synchronously to a preset opening-closing angular position, the unlocking protruding portion abuts against the body of the docking station, to form a torque for driving the second coupling to rotatably switch to the unlocking position, and the engaging structures between the second body and the second coupling member separated from each other.

28. The docking station as claimed in claim 27, further comprising:
an elastic component releasing elastic deformation energy to the second coupling member to facilitate the second coupling to keeping in the locking position with respect to the first coupling member.

29. The docking station as claimed in claim 28, wherein the first coupling member and the second coupling member are articulated via an articulating shaft, the elastic component is a torsion spring sleeved on the articulating shaft, and a spring leg of the torsion spring abuts against the second coupling member to facilitate the second coupling member storing elastic deformation energy in the case where the second coupling member is rotatably switched to the unlocking position.

* * * * *